United States Patent [19]

Conner et al.

[11] Patent Number: 5,124,818

[45] Date of Patent: * Jun. 23, 1992

[54] LCD SYSTEM HAVING IMPROVED CONTRAST RATIO

[75] Inventors: Arlie R. Conner, Portland; Paul E. Gulick, Tualatin, both of Oreg.

[73] Assignee: In Focus Systems, Inc., Tualatin, Oreg.

[*] Notice: The portion of the term of this patent subsequent to Apr. 17, 2007 has been disclaimed.

[21] Appl. No.: 572,732

[22] Filed: Aug. 24, 1990

Related U.S. Application Data

[63] Continuation-in-part of Ser. No. 445,769, Nov. 22, 1989, Pat. No. 5,050,965, and Ser. No. 363,099, Jun. 7, 1989, Pat. No. 4,966,441, and Ser. No. 378,997, Jul. 12, 1989, Pat. No. 4,952,036.

[51] Int. Cl.$^5$ ................................ G02F 1/13
[52] U.S. Cl. ........................... 359/53; 359/62; 359/74; 359/87; 359/93
[58] Field of Search .............. 350/335, 334, 336, 340, 350/341, 339 R; 359/62, 63, 64, 73, 53, 87, 93, 74

[56] References Cited

U.S. PATENT DOCUMENTS

| | | | |
|---|---|---|---|
| 4,201,453 | 5/1980 | Kobale et al. | 350/340 |
| 4,294,518 | 10/1981 | O'Connor et al. | 350/335 X |
| 4,408,837 | 10/1983 | Kozaki et al. | 359/87 |
| 4,448,490 | 5/1984 | Shibuya et al. | 350/335 |
| 4,466,702 | 8/1984 | Wiener-Avnear et al. | 350/347 R |
| 4,664,482 | 5/1987 | Kando et al. | 350/346 |
| 4,763,993 | 8/1988 | Vogeley et al. | 350/331 T |
| 4,864,390 | 9/1989 | McKechnie et al. | 358/60 |
| 4,917,464 | 4/1990 | Conner | 350/335 |
| 4,917,465 | 4/1990 | Conner et al. | 350/335 |
| 4,941,737 | 7/1990 | Kimura | 350/335 |
| 4,952,036 | 8/1990 | Gulick et al. | 350/335 |

FOREIGN PATENT DOCUMENTS

0147434  7/1987  Japan ................... 350/335

OTHER PUBLICATIONS

Uchida, Application and Device Modeling of Liquid Crystal Displays in Mol. Cryst. Liq. Cryst., vol. 123, pp. 15-55.

T. J. Scheffer and J. Nehring, Investigation of the electrooptical properties of 270° chiral nematic layers in the birefringence mode, Oct. 15, 1985, J. Appl. Phys., vol. 58, No. 8, pp. 3022-3031.

*Primary Examiner*—Stanley D. Miller
*Assistant Examiner*—Huy K. Mai
*Attorney, Agent, or Firm*—Dirks B. Foster

[57] ABSTRACT

An LCD display system is formed by stacking two or more independently operated LCD elements. By exploiting the birefringent effect of STN nematic liquid crystals a full range of colors may be displayed. Display rows in the stacked panels are preferably interlaced to achieve high display resolution. Optics are desirably included to collimate light, illuminating the stacked elements, to reduce parallax effects and to disperse light exiting the stacked elements to permit wide angle viewing. The contrast between a pixel in the dark state and in the white state of the high resolution display system may be increased by modifying the $\Delta$nd product of the liquid crystal in the passive regions to compensate for the natural birefringence of the liquid crystal in optically aligned active regions.

19 Claims, 26 Drawing Sheets

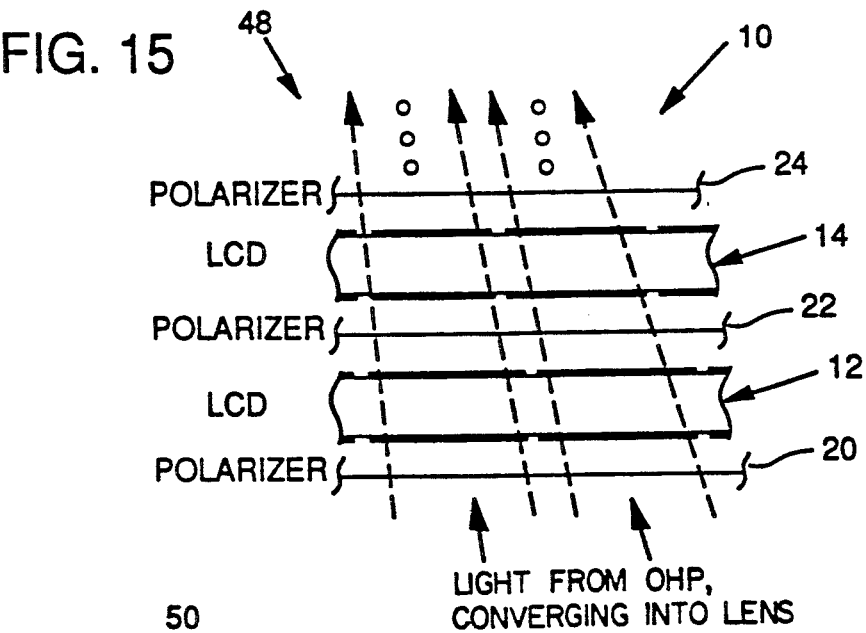
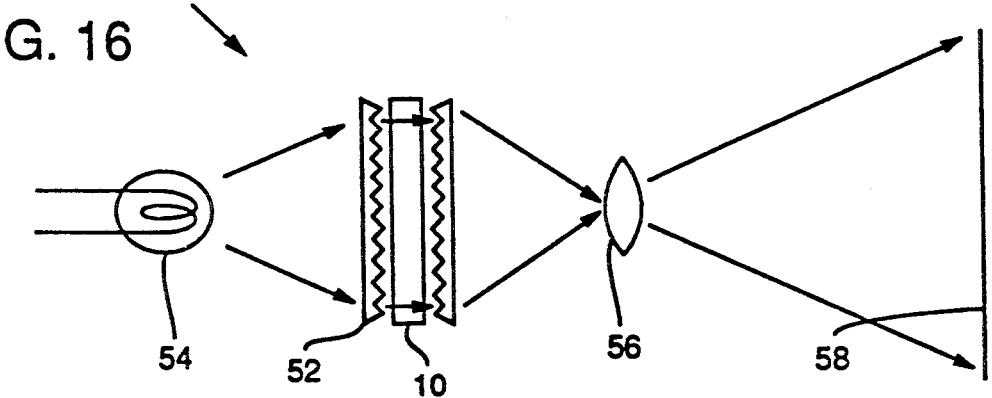
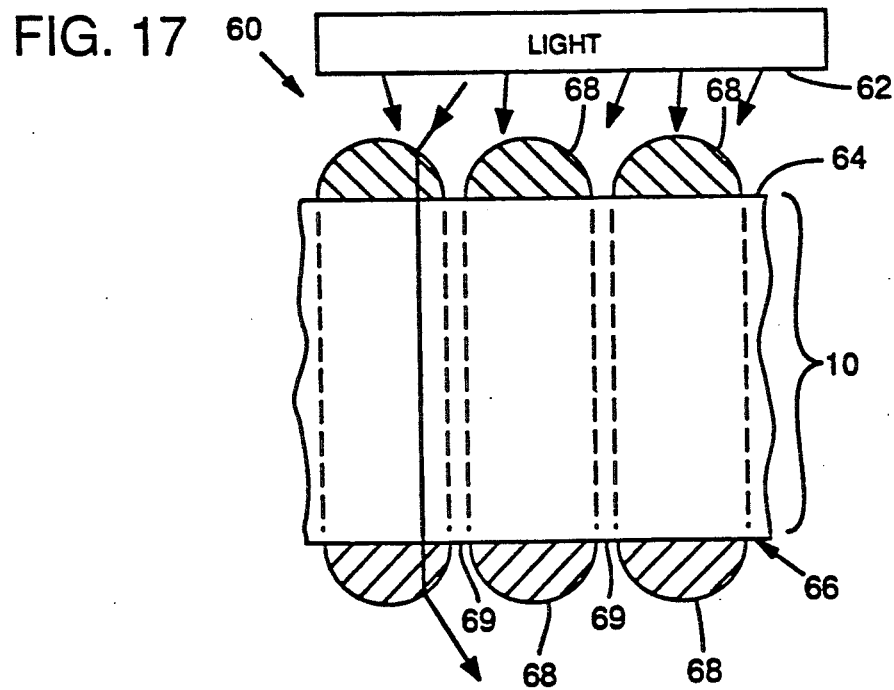

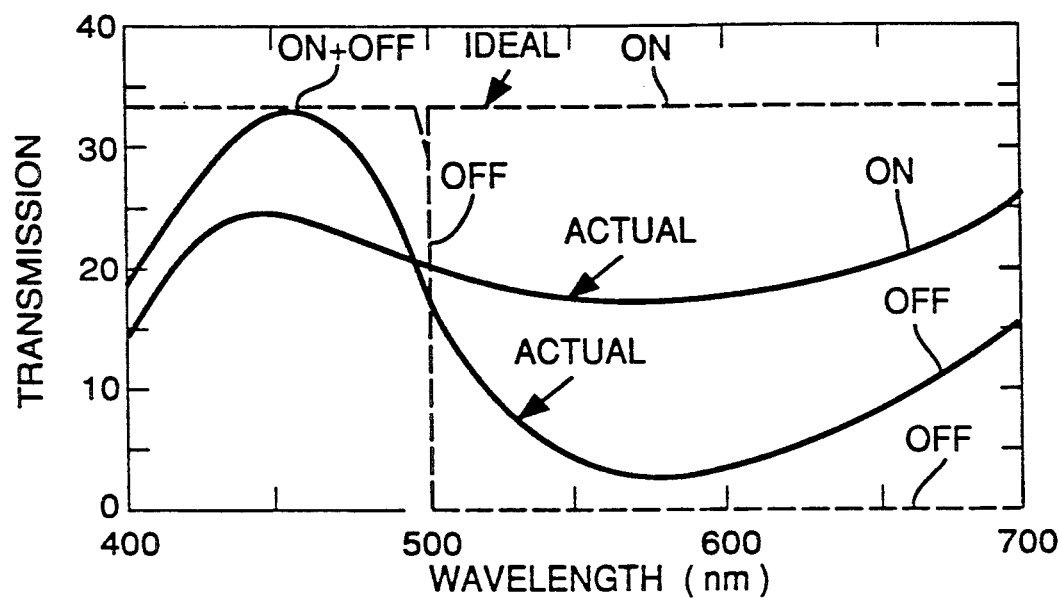
FIG. 44  TRANSMISSION SPECTRUM BLUE MODE
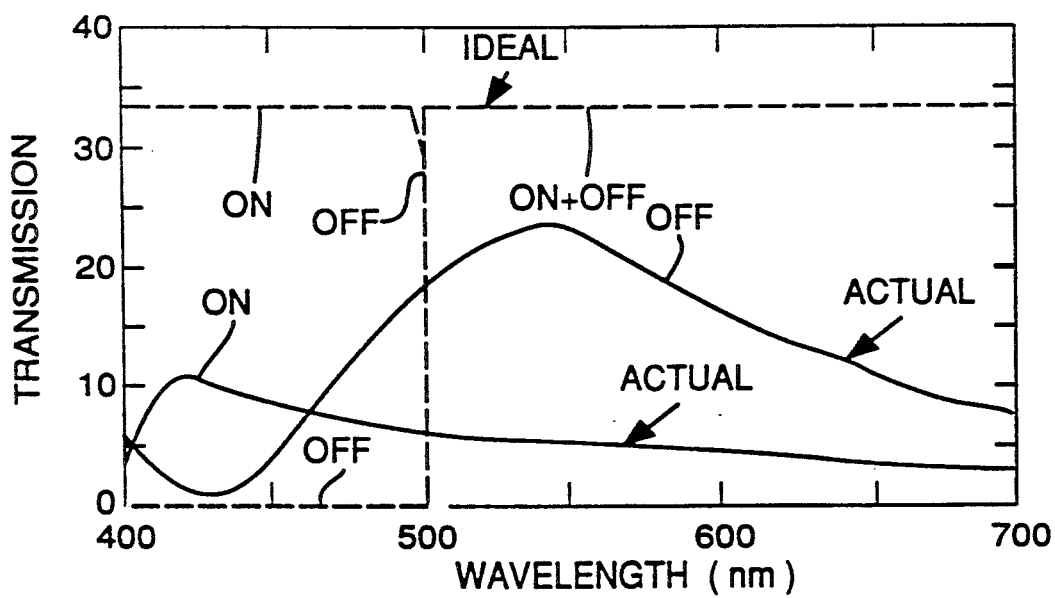
FIG. 45  TRANSMISSION SPECTRUM YELLOW MODE

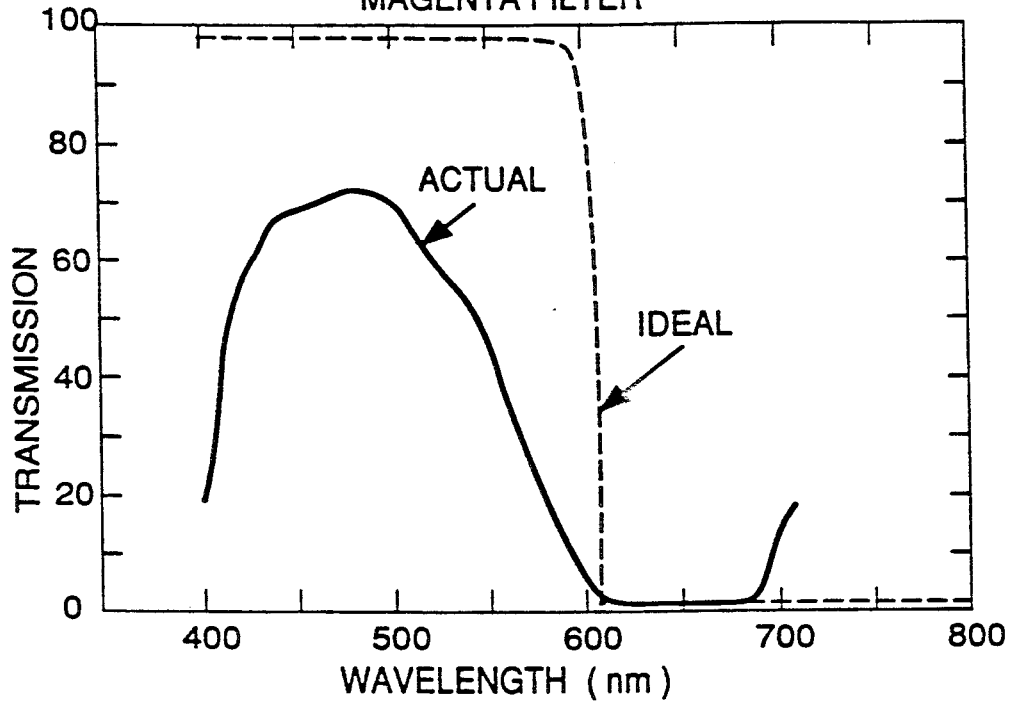
FIG. 46 TRANSMISSION SPECTRUM MAGENTA FILTER
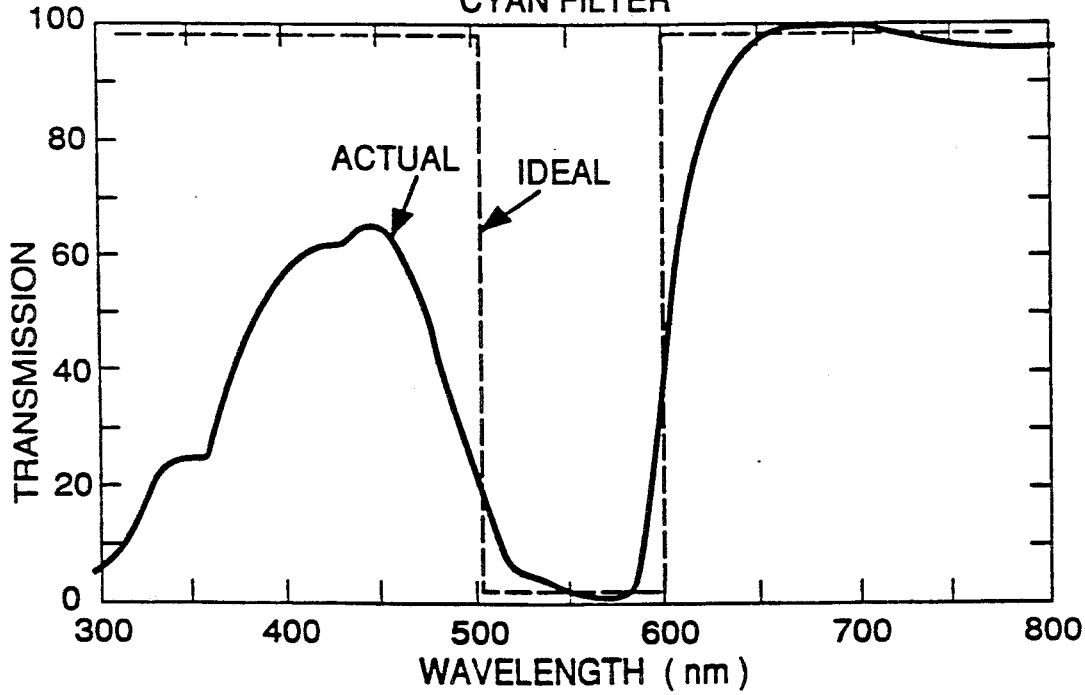
FIG. 47 TRANSMISSION SPECTRUM CYAN FILTER

LCD SYSTEM HAVING IMPROVED CONTRAST RATIO

RELATED APPLICATION DATA

This application is a continuation-in-part of copending applications Ser. No. 07/445,769, filed Nov. 22, 1989, now U.S. Pat. No. 5,050,965, Ser. No. 07,/363,099, filed Jun. 7, 1989, now U.S. Pat. No. 4,966.441 and of allowed application Ser. No. 07/378,997, filed Jul. 12, 1989, now U.S. Pat. No. 4,952,036. The present application is also related, through its parents, to Ser. No. 07/402,134, filed Sep. 1, 1989, now U.S. Pat. No. 4,917,465, and Ser. No. 07/329,938, filed Mar. 28, 1989, now abandoned. These applications, patents, and patents subsequently referenced are incorporated herein by reference.

BACKGROUND OF THE INVENTION

Much effort has been made in recent years to develop low power color displays. Such efforts have generally employed LCD panels in one of three configurations.

In the first configuration, a plurality of differently colored LCD panels are stacked and illuminated with white light. As the light passes through the stacked layers, pixels in each panel act as controllable color filters, selectively coloring the light exiting the display. U.S. Pat. No. 3,703,329 is representative of such systems and shows a stack of three panels, variously dyed to individually produce the colors yellow, cyan and magenta. Together the panels cooperate, using subtractive color, to produce all eight primary colors. A related system is shown in U.S. Pat. No. 4,416,514. In this system, differently dyed polarizers (yellow, magenta and cyan) are interposed in a series of twisted nematic cells. By varying the voltage applied to each cell, the twist angle of the liquid crystal molecules changes, imparting a variable rotation to the light exiting the cell. The colored polarizers cooperate with this controllably twisted light to select desired colors.

While such stacked cell systems can provide a full color display, they typically have certain drawbacks. One is parallax, inherent in any stacked optical system. Another is poor brightness, due to absorption of light by the dye in dyed cell systems, and due to blockage of cross polarized light by polarizers in systems that rely on polarization rotation to differentiate colors.

The second approach uses only a single LCD panel, but uses it in conjunction with a mosaic color filter. The mosaic filter typically has a plurality of red, green and blue filter elements, each aligned with a pixel in the LCD panel. By controlling the transmissivity of pixels in the LCD panel, the display can pass light through selected areas of the color mosaic filter.

While the color mosaic technique addresses certain shortcomings of the stacked panel approach, it introduces certain problems of its own. One is that brightness is limited because, in the classical color mosaic approach, less than a third of the active pixel area transmits light for any given color. Another shortcoming of the classical approach is that pixel density must be increased by a factor of three to obtain the same resolution as the stacked cell approach. That is, to provide a color display with a horizontal resolution of 640 colored pixels, for example, the LCD panels must have 1920 pixels, 640 for each of the red, green and blue filter elements. This introduces fabrication problems that decrease yields and increase panel costs. Further, the finite width of the gap between pixels must remain, even though the pitch has decreased, so the actual pixel "aperture ratio" can be decreased dramatically. (Some small format thin film transistor (TFT) displays have a total open aperture area of only 30% of the total display surface due to row and column lines and transistor area, etc.)

The third approach is birefringence color. In such systems, the birefringent operating mode of certain materials is exploited to produce color, as opposed to reliance on colored dyes in guest-host type cells or reliance on rotation o light through known twist angles in twisted nematic cells.

Birefringent color systems typically take two forms: those relying on passive birefringent layers to impart a birefringent effect to a liquid crystal cell (as shown in U.S. Pat. No. 4,232,948), and those in which the liquid crystal material itself exhibits a birefringent effect (sometimes called "electrically controlled birefringence" or "tunable birefringence"). In the latter instance, the degree of birefringence is a function of the voltage applied to the liquid crystal material. By switching the applied voltage to different values, different colors can be produced. Color displays relying on this principle are shown in U.S. Pat. Nos. 3,785,721, 3,915,554 and 4,044,546.

During recent years, so called "supertwisted" or "highly twisted" nematic cells have become popular in many applications. Such cells are described, inter alia, in U.S. Pat. Nos. 4,697,884 and 4,634,229. Supertwisted nematic (STN) cells generally function in a birefringent mode. However, unlike earlier birefringent cells, STN cells exhibit a bistable behavior wherein they switch rapidly from a deselect (a.k.a. nonselect) state to a select state and back again as the excitation (RMS) voltage crosses a switching threshold. The select and deselect voltage regions can be made quite close to one another, such as 1.20 volts and 1.28 volts, permitting the cells to be multiplexed at high rates. FIG. 1 shows the transmission curve of a representative STN cell (with a particular polarizer orientation) as a function of applied voltage, illustrating the steepness of the switching function. Note that this curve shows the overall photopic "brightness" and does not reveal any coloration of the liquid crystal in the select and deselect states.

It is the multiplexibility of STN cells that makes them particularly desirable. This multiplexibility is achieved without active elements (i.e. drive transistors on each pixel, etc.) and without exotic alignment and liquid crystal operating modes (i.e. ferroelectric, phase-change, hysteresis, etc.). Thus, STN provides an inexpensive direct-multiplexed display type requiring only M+N drivers to operate a display comprised of M×N pixels.

There is an inverse-squared relationship between the number of display lines to be "addressed" and the difference between display "on" and "off" driving voltages (RMS average). As the number of display lines increases, the difference in driving voltage must decrease. To illustrate, a multiplex rate of 100:1 can be achieved with approximately a 10% difference in driving voltages, and a MUX rate of 240:1 can be achieved with approximately a 6% difference in driving voltages. Theoretically, arbitrarily high MUX rates can be achieved if the driving voltage difference is made small enough.

The main drawback to STN cells is the optical operating mode—birefringence. That is, the only way to distinguish pixels driven by the "on" voltage from those driven by the "off" voltage is the difference in birefringence between the two pixels. (As noted, for high information content displays, the difference in driving voltages is minute and decreases rapidly with an increase in the number of display lines that must be driven.) To distinguish the difference in pixel birefringence, polarizers are used—one to polarize the entering light to a known polarization, and one to select only one polarization of exiting light for examination. Depending on the state of the pixels, the light oriented to pass through the exit polarizer will be one of two colors. For best contrast, the polarizers are usually arranged so that these two colors are yellow and blue. (Actually, only one color can be selected by orientation of the polarizers—and this color can only be selected from a relatively small spectrum of colors. There is very little design freedom in varying the color in the second state—it is essentially a function of the first color.)

FIG. 2 shows the transmission characteristics of a representative yellow/blue mode STN cell (with associated polarizers) when the cell is in its select and deselect states. As can be seen, when the cell is "selected" (by applying an excitation voltage of 1.56 volts), the transmission spectrum has a maximum at 400 nanometers, a minimum at 600 nanometers, and an intermediate value at 500 nanometers. When the cell is "deselected" (by reducing the excitation voltage to 1.41 volts), the transmission spectrum includes a null at 400 nanometers, a maximum at 500 nanometers, and an intermediate value at 600 nanometers. Light exiting the cell/polarizer combination in the select state is thus principally blue, and light exiting in the deselect state is green plus yellow plus red, which appears as yellow to the human observer.

Unlike TN cells and cells operating in other modes, a birefringent STN cell cannot be operated in a black/white mode. The reason is that black requires all wavelengths of light to be linearly cross-polarized with the exit polarizer to effect complete light blockage, and true white requires all wavelengths of light to be linearly polarized parallel with the exit polarizer to effect complete light passage. The birefringent operating mode, by definition, prevents such results since different wavelengths of light are polarized differently during passage through the material, rendering a linear polarizer incapable of either blocking all or passing all wavelengths of the exiting light. Thus, STN cells are unavoidably colored. However, this drawback has been tolerated in order to achieve the high multiplexibility that STN provides.

In order to eliminate the birefringence color, some manufacturers have incorporated various compensation layers in display assemblies. One such compensation layer is a second birefringent cell of opposite twist than the first to counteract the wavelength dependence in the cell's behavior. While color effects are eliminated with this configuration, it is not possible to achieve both a high contrast ratio and a high multiplex rate.

Another type of compensation layer, sometimes used in conjunction with the above-mentioned blue/yellow mode STN LCDs, is a polarizer that has been dyed to pass cross-polarized light in the blue and red portions of the spectrum in order to make the yellow state of the LCD "whiter." This still yields a blue/white LCD, instead of the desired black/white. However, this color limitation is usually accepted in order to achieve the high multiplex ratio.

Further, while the birefringence of STN cells unavoidably produces colors, the colors so produced are generally considered too limited in range and too inferior in quality to be suitable for use in color displays. Far preferred are the rich colors that can be achieved with guest-host cells, or TN cells with dyed filters.

Another problem with prior art LCD displays is their relatively low resolution. The resolution of LCD panels is limited both by interconnection constraints and by the electrical properties of the liquid crystal material itself. Taking this latter limitation first, in any multiplexed LCD display, each cell must be electrically refreshed periodically, typically 30 or 60 times a second, to maintain its desired state. This is effected by repetitively scanning down the panel, refreshing each row in turn. The greater the resolution of a panel, the greater the number of rows that must be refreshed at this rate. Beyond a certain limit, the period allotted to refreshing each row becomes too short to refresh it effectively. Thus, a minimum refresh period limits the number of rows that can be refreshed at the requisite rate. This number is about 250–300 rows with current liquid crystal materials.

In the prior art, displays with twice this number of rows have been achieved by duplicating the refresh circuitry so that half the rows of the panel are refreshed by one circuit and half are refreshed by the other. Thus, at any instant, two rows are being refreshed—one by one circuit and one by the other. However, this technique still only permits 500 or so rows of resolution. Truly high resolution applications demand substantially more rows.

The obstacle to refreshing more than 500 rows is the interconnection limitation. The refresh circuitry must connect to each column of pixels on the display. There may be 640 or more such columns. By partitioning the display into top and bottom portions, the two requisite 640 wire connections can be made—one along the top of the display and one along the bottom. However, this partitioning approach cannot be extended to a three- or more way division because there is no way to make the requisite interconnect to intermediate portions of the display.

The interconnect limitation is generally accepted to be an absolute bar to arbitrarily-high resolution LCD displays, as noted in "Scanning Limitations of Liquid Crystal Displays" by P.M. Alt et al, IEEE Trans. Electron Devices, Vol. ED-21, pp. 146–155 (1974); and "Ultimate Limits for Matrix Addressing of RMS-Responding L.C.D.'s" by J. Nehring et al, IEEE Trans. Electron. Devices, Vol. ED-26, p. 795–802 (1979).

SUMMARY OF THE INVENTION

In accordance with a first preferred embodiment, a color display system is formed by operating a plurality of birefringent cells in cooperation with one or more colored polarizers, thereby complementing and correcting the birefringence colors and yielding a brighter display.

In an alternative embodiment, a color display is formed by operating two colored cells (typically colored by birefringence color) in cooperation with a 2-color mosaic filter.

In yet another embodiment, a high resolution display is produced by stacking cells with interlaced display rows and opposite twist senses. The contrast ratio is significantly improved by modifying the Δnd product in the passive regions of a multi-stacked cell according to a mutual compensation scheme. In one embodiment, a clear non-birefringent material is deposited in the regions between the row electrodes.

In an alternative embodiment, passive row electrodes are introduced between the active row electrodes on each panel. The passive row electrodes bias the liquid crystal in the passive regions at a constant non-select voltage thereby improving the contrast ratio.

The passive row electrodes, which must be periodically refreshed, are preferably connected in parallel. The parallel connection permits all compensator row electrodes to be simultainously refreshed. Thus for a display system having a 240:1 multiplexed refresh rate, the addition of the passive row electrodes require only a 241:1 multiplexed rate.

The features and advantages of the claimed invention will be more readily apparent from the following detailed description, which proceeds with reference to the accompanying drawings.

BRIEF DESCRIPTION OF THE DRAWINGS

FIG. 15 shows a second projection system according to the disclosed system.

FIG. 16 shows a self contained color display using a display subassembly according to the disclosed system with associated projection optics.

FIG. 17 shows a first direct view display system according to the disclosed system.

FIG. 44 is a spectral plot showing ideal and actual light transmission characteristics for a blue LCD panel used in the hybrid display subassembly of FIG. 41.

FIG. 45 is a spectral plot showing ideal and actual light transmission characteristics for a yellow LCD panel used in the hybrid display subassembly of FIG. 41.

FIG. 46 is a spectral plot showing ideal and actual light transmission characteristics of cyan filter elements used in a color mosaic filter in the hybrid display subassembly of FIG. 41.

FIG. 47 is a spectral plot showing ideal and actual light transmission characteristics of magenta filter elements used in a color mosaic filter in the hybrid display subassembly of FIG. 41.

DETAILED DESCRIPTION

Color Generation

Figure 1:
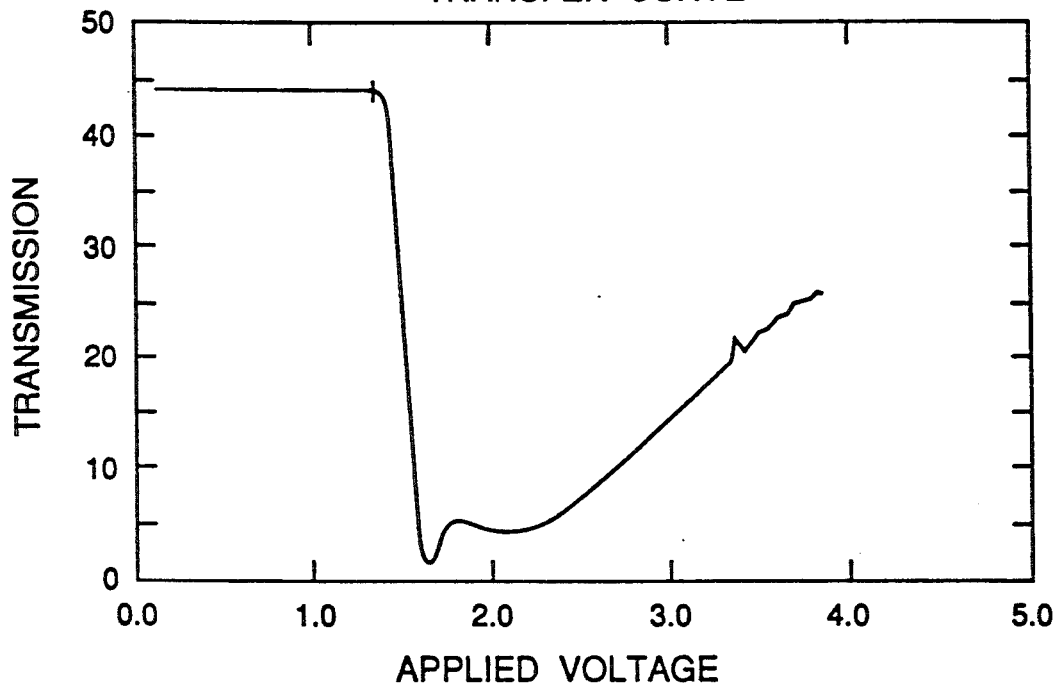
FIG. 1 shows the transmission characteristics of a representative STN cell as a function of applied voltage.

Before proceeding, it may be helpful to first review certain principles of color optics. The primary light colors are generally considered to be red, green and blue. White light is composed of all three primaries. White light with red filtered (i.e. removed) therefrom is termed cyan; white light with green filtered therefrom is termed magenta; and white light with blue filtered therefrom is termed yellow. These latter colors, cyan, magenta and yellow, are sometimes termed subtractive primary colors, since they denote the absence of one of the primary colors.

Filters selectively attenuate (or "absorb") light of certain colors and pass light of other colors relatively unattenuated. A red filter, for example, attenuates blue and green light and lets red light pass. Similarly, a blue filter attenuates red and green light and lets blue light pass. Finally, a green filter attenuates red and blue light and lets green light pass. Filters of the primary colors thus subtract two primary colors and let the third pass.

Filters of the subtractive primary colors subtract one primary color and let the two others pass. For example, a cyan filter attenuates red light and lets blue and green light pass. Similarly, a magenta filter attenuates green light and lets blue and red light pass. Finally, a yellow filter attenuates blue light and lets green and red light pass.

These properties are summarized in Table I.

TABLE I

| Filter | Absorbs | Passes |
| --- | --- | --- |
| Red | Green, Blue | Red |
| Green | Red, Blue | Green |
| Blue | Red, Green | Blue |
| Yellow | Blue | Green, Red |
| Cyan | Red | Blue, Green |
| Magenta | Green | Blue, Red |

Again, although somewhat counter-intuitive, it should be remembered that a blue filter does not absorb blue light. It passes blue light and blocks light of other colors.

It should further be noted that the human eye is more sensitive to certain wavelengths of light than to others. The eye's normal daytime response (termed "photopic" response) typically peaks at about 554 nanometers and diminishes to near negligible values around 400 and 700 nanometers.

For convenience of discussion, the optical spectrum is generally segregated into the red, green and blue portions by dividing lines at 500 and 600 nanometers. (For physiological reasons, a precise dividing line cannot be defined.) Using these boundaries, the human eye perceives 55% of the energy in white light from the green portion of the spectrum (500 to 600 nm.), 30% from the red portion (above 600 nm.), and only 15% from the blue portion (below 500 nm.). Perfect green, red and blue filters thus transmit 55%, 30% and 15% of white light, respectively (photopically). Since yellow, cyan and magenta are combinations of these colors, it can be seen that perfect yellow, cyan and magenta filters transmit 85%, 70% and 45% of white light, respectively.

Many of the illustrated embodiments employ supertwisted nematic LCD panels that are controllably colored by exploitation of the birefringence effect. As mentioned in the Background discussion, birefringence is an optical phenomenon in which light oriented along one axis of a material propagates at a different speed than light oriented along another axis. This asymmetry results in different wavelengths of light having different polarizations when they exit the material. Polarizers can be used to analyze the elliptically polarized light exiting the panel to select colors. Prior art uses of birefringence to control color in LCD panels are discussed in U.S. Pat. Nos. 3,876,287, 4,097,128, 4,127,322, 4,394,069, 4,759,612 and 4,786,146.

Display Subassembly

Figure 3:
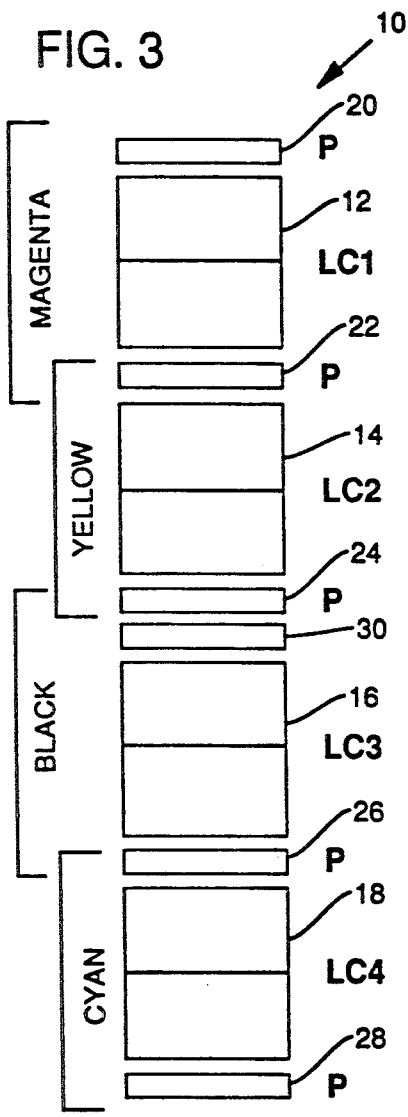
FIG. 3 is a schematic diagram of a display subassembly according to one embodiment of the disclosed system.

Turning now to FIG. 3, there is shown a basic display subassembly 10 according to one embodiment of the disclosed system. The illustrated subassembly includes four LCD panels 12, 14, 16, 18 sandwiched alternately between five polarizers 20, 22, 24, 26 and 28. An optional retardation film layer 30 is also shown.

In the illustrated subassembly 10, the birefringent properties of the panels 12-18 are "tuned" (by choosing the thickness (d) of the liquid crystal layer and its optical refractive index anistropy ($\Delta n$)) to yield a desired coloration. For example, the birefringent properties of the first panel 12 are tuned so that incoming green light (which has been polarized by the entrance polarizer 20) propagates through the liquid crystal material in such a manner that the orientation of its principal axis upon leaving the cell is orthogonal to the exiting polarizer 22 when the panel 12 is in its deselected (i.e. deenergized)

state. The panel 12 and polarizers 20 and 22 thus act as a magenta filter when the panel is deselected. The tuning of panel 12, and the orientations of the associated polarizers, are also selected so that, when the panel is in its selected (i.e. energized) state, green light is passed, together with red and blue light, to yield a substantially "white" color. (For expository convenience, panel 12 is sometimes called the "magenta" panel and is said to controllably absorb green light. It will be recognized, however, that this and the other panels must generally be operated in conjunction with associated front and back polarizers to achieve the desired coloring effect.)

The illustrated second panel 14 is similarly tuned to operate as a yellow filter (i.e. absorbing blue) when in its deselected state and to pass all wavelengths of light (i.e. white light) when in its selected state. It is sometimes termed the "yellow" panel. The illustrated fourth panel 18 is similarly tuned to operate as a cyan filter.

The illustrated third panel 16 is an optional "black" panel that may be included to increase contrast. Its construction may take any of a number of forms, as discussed below.

As mentioned earlier, it is the thickness (d) of the liquid crystal layer and its optical refractive index anistropy ($\Delta n$) that principally determine each panel's spectral response for a given twist angle $\Psi$. While the panel's response is determined by a complex formula, the response can be roughly approximated as dependent on the ratio $\Delta nd/\Psi$.

In the illustrated embodiment, these ratios have the values shown in Table II:

TABLE II

| Panel | $\Delta nd$ | $\Psi$ | |
|---|---|---|---|
| Magenta | 0.19 | 4.19 | (rad.) |
| Yellow | 0.23 | 3.84 | |
| Cyan | 0.25 | 4.19 | |

It will be recognized that the $\Delta nd/\Psi$ ratios referenced in Table II can be achieved with any number of cell thicknesses. (The artisan will further recognize that these ratios may be achieved by use of various passive compensation layers.) The choice of cell thickness is a tradeoff between several factors, including the panel's response time and uniformity. The response time of the panel generally increases with the panel thickness. Consequently, to achieve a fast response time, it is desirable to use a thin panel. However, as the cell thickness decreases, small fabrication errors, such as a 1 $\mu$m change in cell thickness over the width of a panel, yields a relatively large variation in panel color behavior and switching threshold voltage. To insure color uniformity, it is desirable to use a thick panel so fabrication errors are kept to a small percentage of the total liquid crystal thickness. As a compromise between these considerations, a cell thickness of 6 to 12 $\mu$m may be used.

Figure 4:
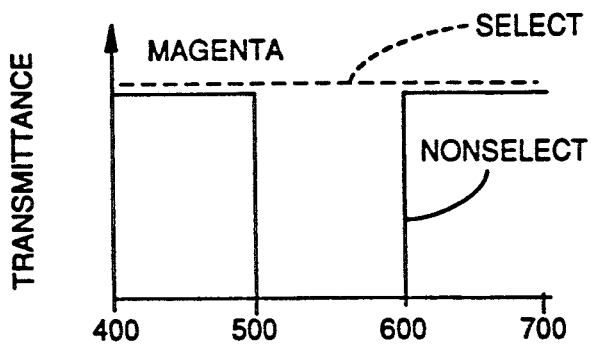
FIGS. 4-6 are spectral photometer plots showing ideal light transmission characteristics for three liquid crystal panels used in the display subassembly of FIG. 3 when in their selected and deselected states.
Figure 5:
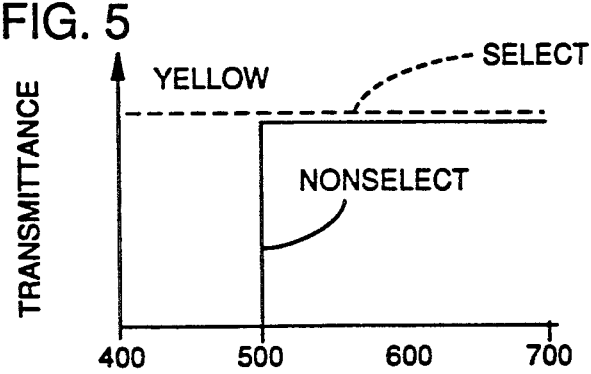
Figure 6:
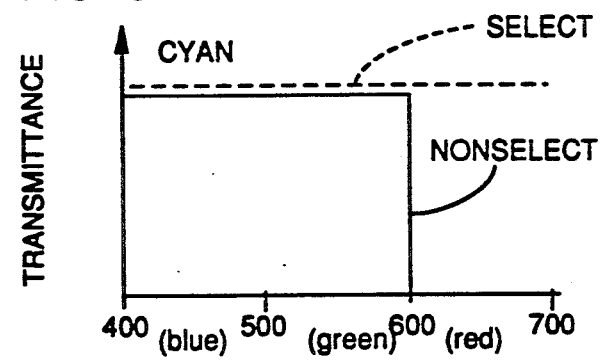
Figure 7:
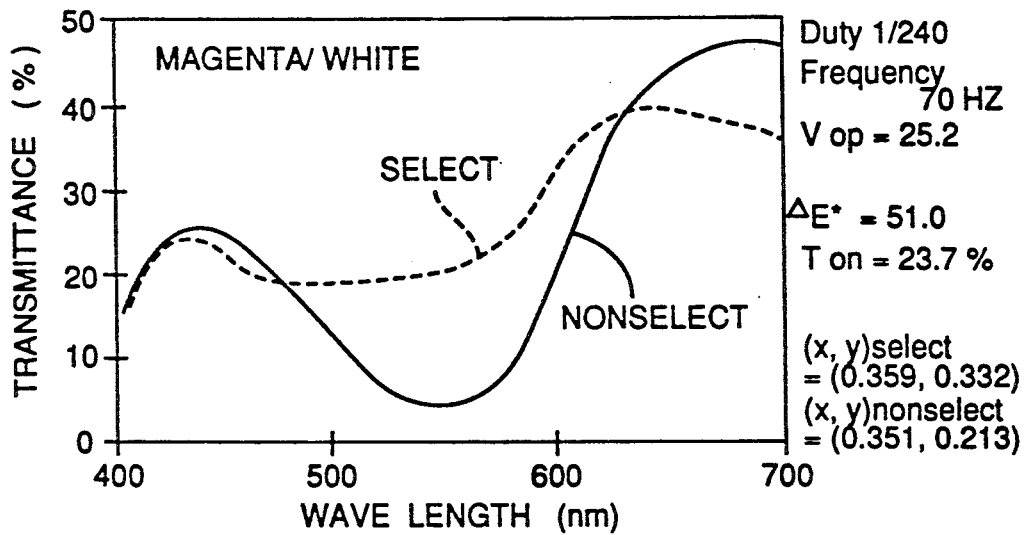
FIGS. 7-9 are spectral photometer plots showing the actual light transmission characteristics of three Kyocera liquid crystal panels used in the display subassembly of FIG. 3 when in their selected and deselected states.
Figure 8:
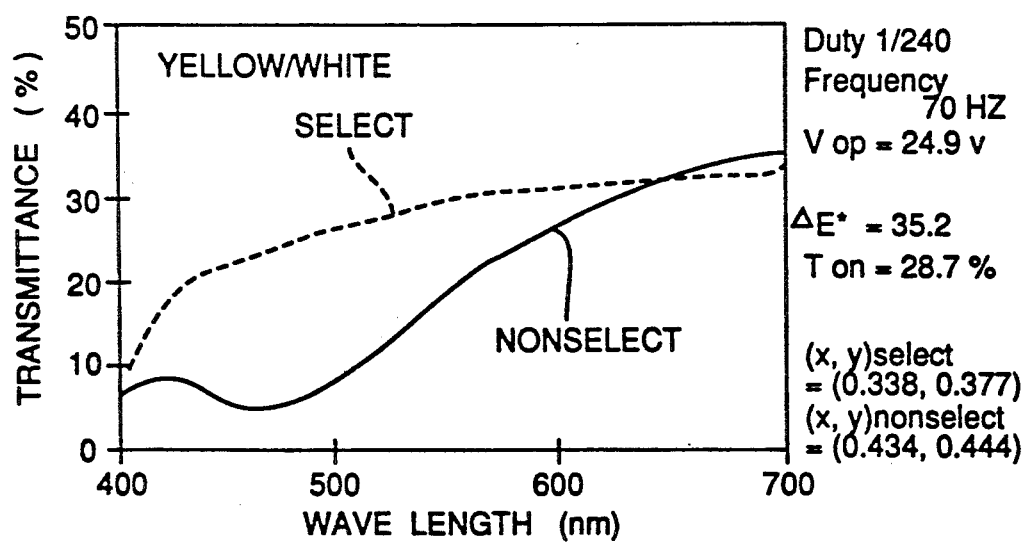
Figure 9:
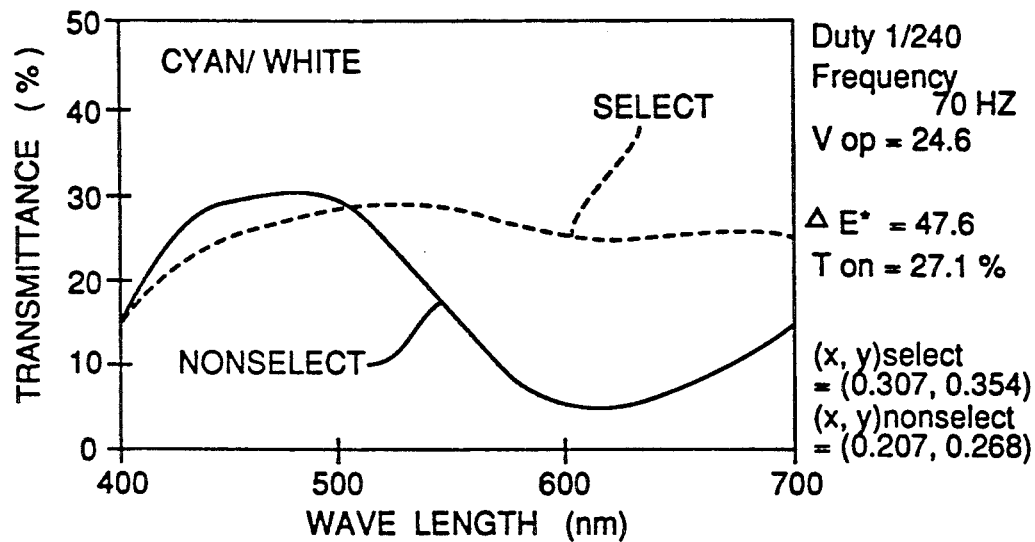
Figure 10:
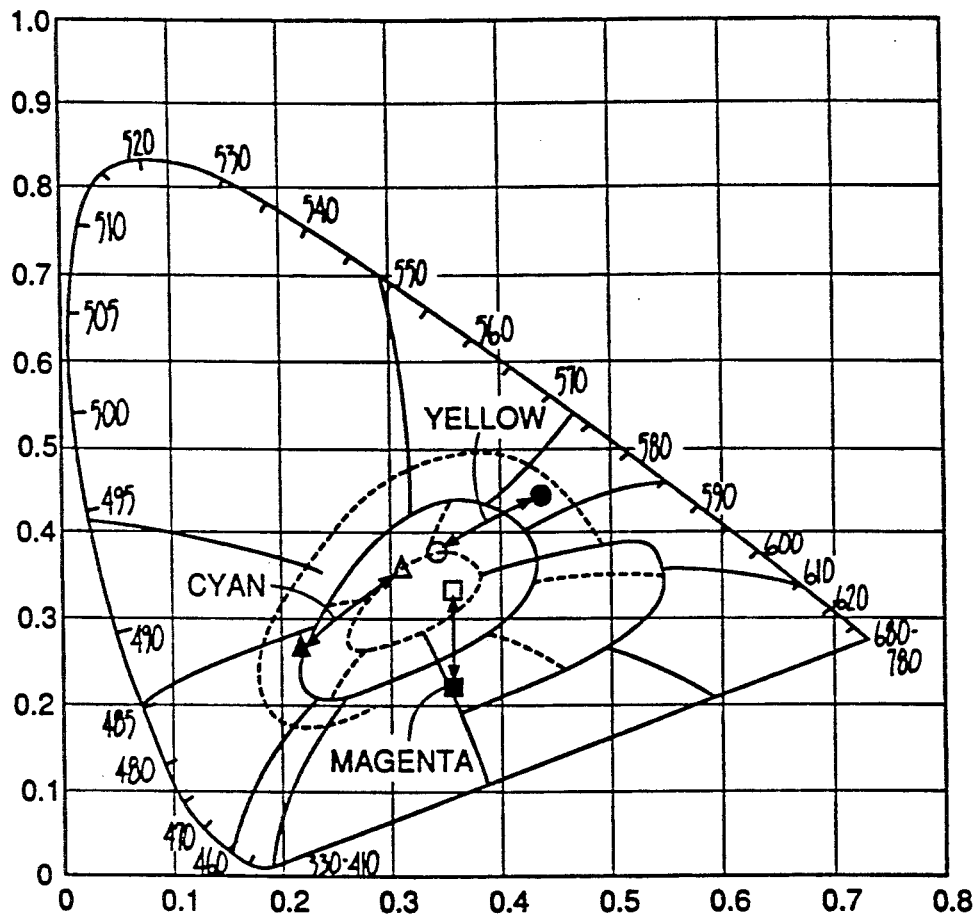
FIG. 10 is a diagram illustrating the chromaticity of the Kyocera panels of FIGS. 7-9 when in their selected and deselected states.

Spectral photometer plots showing the light transmission qualities of ideal panels 12, 14 and 18 (again, considered in conjunction with their associated polarizers) are provided in FIGS. 4, 5 and 6, respectively. Panels suitable for use as panels 12, 14 and 18 are available from Kyocera of Hayato, Japan as part numbers KC-6448ASTP-SC-M, KC-6448ASTP-SC-Y and KC-6448ASTP-SC-C, respectively, or may be fabricated using known techniques. Spectral photometer plots showing the actual behavior of the Kyocera panels are provided in FIG. 7-9. The plot for the magenta panel in FIG. 7 was made with a red entrance polarizer. The plot for the cyan panel in FIG. 9 was made with a blue exit polarizer. (As can be seen from these curves, neither the passage of light of the desired color nor the attenuation of light of undesired colors is perfect, but the resulting effect is more than adequate to provide saturated colors throughout the human visual area.) A chromaticity diagram illustrating performance of the Kyocera panels in their selected and deselected states is provided in FIG. 10.

Each of panels 12-18 comprises a plurality of pixels that can be individually energized to change the spectral distribution of the light that is permitted to pass therethrough. By selecting corresponding pixels in the three colored panels, light of any color can be transmitted through the display subassembly 10. To transmit a pixel of green light, for example, a pixel in the yellow panel 14 is deselected to absorb blue light, and the correspondingly positioned pixel in the cyan panel 18 is deselected to absorb red light. By superimposing the spectral transmission curves of these two pixels, it will be recognized that the remaining, transmitted light has a peak in the region of the spectrum the eye perceives as green. (The magenta panel 12 is left selected (i.e. substantially white transmitting) in this example and thus has no relevant filtering effect.)

Figure 11:
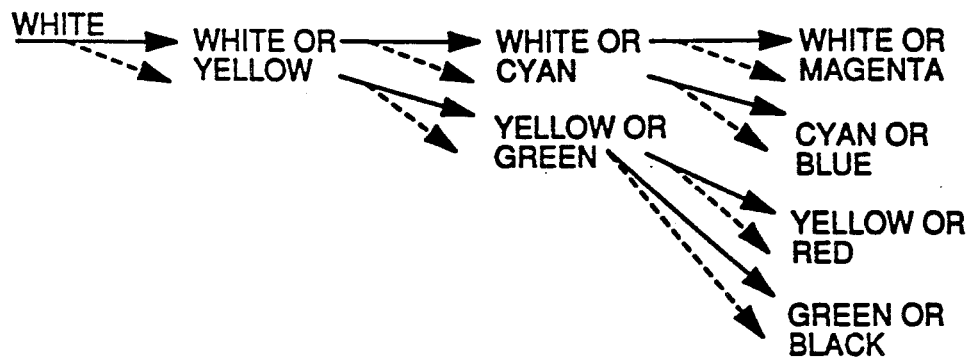
FIG. 11 is a diagram showing the eight basic colors achieved by operating yellow, cyan and magenta panels in their various combinations.

The color blue can be similarly achieved by deselecting corresponding pixels in the cyan and magenta panels, and red can be achieved by deselecting corresponding pixels in the yellow and magenta panels. If it is desired to absorb all light and thus produce a black pixel on the image plane, pixels in all three panels are deselected. FIG. 11 shows the eight basic colors achieved by operating a yellow/cyan/magenta series of panels in their various combinations.

Polarizers are needed to analyze the light passing through the liquid crystal panels in order to achieve perceptible contrast. In prior art systems, the polarizers are typically neutral (i.e., dyed black by iodine). In the disclosed system, colored polarizers (which are "leaky") can be used advantageously in certain positions to pass more light, improving the brightness and allowing color balance improvements.

The first panel 12 is illustrated as being "magenta." Light entering it is polarized b the first polarizer 20. Normally, all colors of light orthogonal to the axis of polarizer 20 would be absorbed by the black dye of a conventional, neutral polarizer, resulting in an immediate loss of 50% (theoretical) of the light. (In actual practice, the loss of a neutral polarizer is about 55-58%.) This loss can be cut dramatically if the first polarizer is dyed magenta. Such a polarizer still passes the white light parallel to the polarizer's axis, but additionally passes blue and red light orthogonal to its axis. This additional blue and red light is permitted to pass further into the display subassembly and ultimately contributes to the overall brightness of the resulting display, instead of being absorbed by the first polarizer as is normally the case. The losses normally associated with this first polarizer are thus cut by about two thirds. Display brightness improves commensurately.

(In an alternative embodiment, the entrance polarizer 20 may be dyed another color, such as red. While theoretically not as advantageous as a magenta polarizer, a red polarizer is easier to realize and still offers a substantial improvement in brightness, passing about 59% of the incident light, as opposed to 45% or less for a neutral polarizer.)

The same benefit can be achieved at the exiting end of the sandwiched display subassembly 10. The last panel 18 in the subassembly is illustrated as being cyan. By dying the polarizer 28 adjacent thereto cyan, the blue and green light that would normally be absorbed thereby is allowed to leak through and pass out of the display subassembly, again improving display brightness.

(Again, the exit polarizer 28 may be dyed a color, such as blue, instead of cyan. A blue polarizer passes about 56% of the incident light, still yielding a significant improvement in brightness over a neutral polarizer.)

Conventional neutral polarizers can be used at the positions (22, 24, 26) intermediate the liquid crystal panels and a significant improvement in display brightness is still achieved by virtue of the two colored polarizers described above. The use of neutral intermediate polarizers also assures that there is no birefringence interaction between panels (i.e. the deselected or selected nature of the $\Delta$nd of the center panel makes no difference to the passage of light and total birefringence of the adjacent panels). (It should be mentioned that such interaction may be advantageously exploited in other embodiments.)

In other embodiments, the polarizers at the intermediate positions in the subassembly may be colored. Care should be taken, however, not to interfere with the color-selective properties of the birefringent panels. For example, if a yellow colored polarizer is interposed between the magenta and yellow panels 12, 14, it will interfere with the color-selective properties of the magenta panel. As noted, the magenta panel itself does not absorb the undesired green light. Instead, its birefringence is tuned so that light propagating through the panel exits with the axis of its principal green component oriented orthogonally to the polarizer 22, causing it to be blocked. If this polarizer 22 is colored yellow, it will leak green and red light, including the green light that is meant to be blocked. Consequently, use of a yellow polarizer between the magenta and yellow panels defeats the careful tuning of the first panel's birefringence.

An equally poor color choice for the first intermediate polarizer 22 is magenta. A magenta polarizer would permit blue and red light to enter the yellow panel 14 at an unexpected orientation. The yellow panel was tuned so that blue light entering at a known polarization would propagate and exit with a principal polarization that would be blocked by the exiting polarizer 24. If the blue light enters the yellow panel 14 at an unexpected orientation, it will exit at an unexpected orientation and will not be blocked by the exiting polarizer. Consequently, use of a magenta colored polarizer 22 defeats the careful tuning of the yellow panel's birefringence.

Polarizer 22 should be colored, if at all, a color that both of the adjoining panels are intended to pass. In this case, since the magenta panel is intended to pass blue and red, and the yellow panel 14 is intended to pass green and red, the polarizer 22 should desirably be colored the common color: red.

If the black panel 16 is omitted (together with associated retardation film 30 and polarizer 26), similar logic would dictate that the polarizer 24 between the remaining yellow and cyan panels should desirably be colored, if anything, green.

In embodiments including a black/white panel, such as panel 16 in FIG. 3, the polarizers positioned adjacent thereto should be neutral (i.e. not colored) since any polarizer coloring would permit the black panel to leak light—an undesired effect.

To optimize display brightness, the dyed polarizers should exhibit a high degree of transmissivity to cross-polarized light in their "leaky" portion of the spectrum. In the illustrated embodiment, the polarizers each comprise a dyed 5 mil sheet of stretched polyvinyl alcohol. Table III specifies suitable dichroic dyes, which are available under various brand names from Crompton & Knowles, Atlantic, Ciba-Geigy and a variety of other dye suppliers.

TABLE III

| POLARIZER | DYE |
| --- | --- |
| Magenta | Direct Red #81 |
| Yellow | Direct Yellow #18 |
| Cyan | Direct Blue #1 |

The foregoing discussion has described only one of many possible sequences of polarizers and panels. Others can be devised. For example, while the first polarizer 20 in the above example has been described as being magenta in order to achieve an improvement in brightness, an alternative embodiment with the same sequence of LCDs can here use a blue or red polarizer instead. A blue or red polarizer still provides some improvement in brightness since it leaks light that would be absorbed by a black polarizer. Of course, a black polarizer can also be used if desired. The basic LCD sequence itself can also be varied with corresponding changes in the associated polarizers. The basic sequences are set forth in Table IV:

TABLE IV

| POL1 | LCD1 | POL2 | LCD2 | POL3 | LCD3 | POL4 |
| --- | --- | --- | --- | --- | --- | --- |
| Y/G/R/K | Y | G/K | C | B/K | M | M/R/B/K |
| M/R/B/K | M | R/K | Y | G/K | C | G/G/B/K |
| Y/G/R/K | Y | R/K | M | B/K | C | C/G/B/K | where Y is yellow, K is black, G is green, C is cyan, B is blue, M is magenta and R is red.

Figure 12:
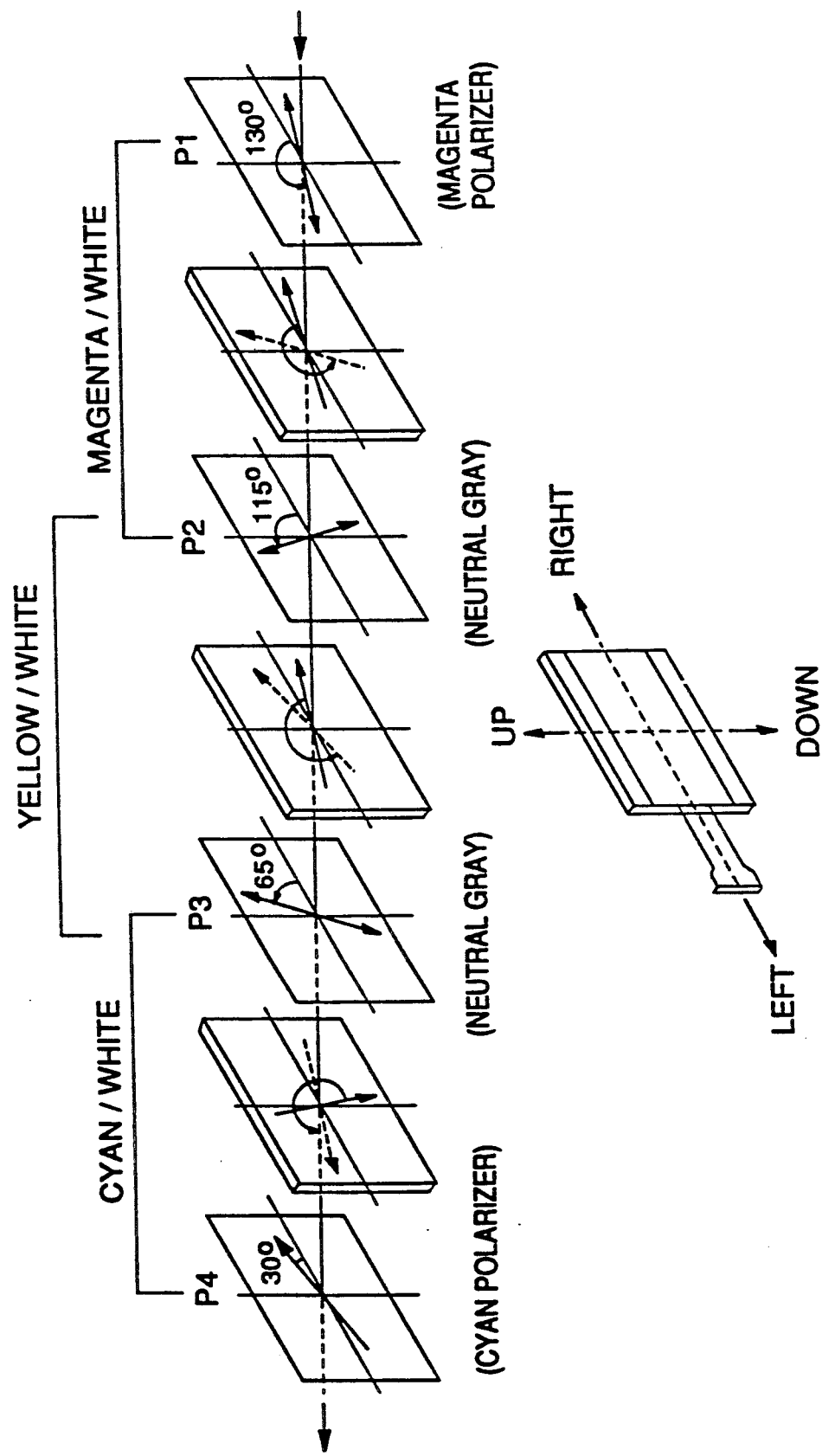
FIG. 12 details the construction of a display assembly incorporating three panels according to the disclosed system.

FIG. 12 illustrates in greater detail a display subassembly using just the magenta, yellow and cyan panels. The polarizers are magenta, black, black and cyan, respectively. Included in FIG. 12 are details of the relative alignment of the component panels and polarizers in an implementation using the Kyocera panels. The alignment angles are typically specified by the manufacturer and depend, inter alia, on the rubbing angles of the front and rear panel plates, the twist of the LCD molecules, and on various boundary layer phenomena associated with the liquid crystal material.

As noted, such a three panel subassembly can produce the color "black" (the absence of light) by deselecting each panel. Since the light passing through the subassembly is progressively stripped of its green, blue and red components, theoretically no light exits the subassembly. As a practical matter, however, the imperfect responses of the three panels permit some light of various colors to leak through at an attenuated level.

The net result is a dark brown or grey color. While such an arrangement yields a contrast ratio of approximately 10:1—more than adequate for many applications—some applications require contrast ratios on the order of 100:1. To achieve such ratios, a fourth panel, such as the "black" panel 16 illustrated in FIG. 3, may be included in the subassembly. The characteristics of the black panel may be optimized for the intended application.

In one application, namely digital computer graphics using the RGBI standard, an "intensity" signal is used to differentiate each of the eight basic colors used in RGB systems into two colors, yielding a total of 16 colors. In such application, the black cell is optimized for maximum transmission when in the selected state. The contrast provided by the cell is of lesser importance. That is, a contrast range of 2:1, or even 1.5:1, will suffice to distinguish the 16 colors of the RGBI system.

In contrast, "full color" systems (i.e. television or high quality color computer graphics) require high contrast. To achieve the 256 or more colors that such systems require, an overall contrast ratio of 100:1 may be needed. Since the basic magenta/yellow/cyan (M/Y/C) subassembly delivers only a 10:1 contrast ratio, the black panel must provide a 10:1 ratio on its own. Thus, it should be optimized for blackest black. By cascading the two systems (M/Y/C and black), the contrast figures are multiplied, producing 100:1 overall white to black contrast, and allowing excellent grey shading and range of color. Of course, highly saturated primary colors still require M/Y/C contrast, but the black panel provides greater depth in the shadows and details in the highlights.

In the illustrated embodiment, the black panel 16 is a supertwisted nematic cell operated in conjunction with a retardation film 30 that tunes the cell for maximum contrast. In other embodiments, a double supertwisted nematic cell or even a twisted nematic cell may be used.

In actual practice, the "black" cell need not be black. A birefringent cell tuned to the blue end of the spectrum, for example, may be used since the human eye is relatively insensitive to blue light, yielding a relatively high photopic contrast ratio.

One advantage of display subassembly 10 is the flexibility it affords in possible panel/polarizer sequences. If one sequence seems unworkable, a design can be optimized about another one. For example, if it is found that a good quality magenta polarizer cannot be obtained, then a design that does not require a magenta polarizer can be adopted.

It will be recognized that display subassembly 10 can be used in a variety of applications, such as color projection systems and in direct view displays. A variety of such applications are detailed below.

Projection Systems

Figure 13:
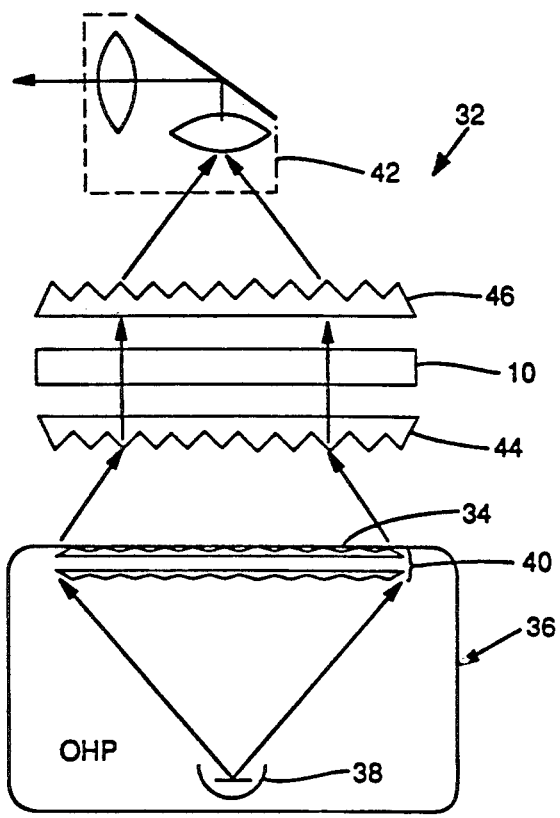
FIG. 13 shows a first projection system according to the disclosed system.

In a first projection system embodiment 32, shown in FIG. 13, a display subassembly 10 is positioned on the transparent projection surface 34 of a conventional overhead projector 36. Such projectors typically include an illumination bulb 38 and a Fresnel lens 40 under the projection surface to produce light beams that pass through a transparency and converge onto a projection lens assembly 42. (Due to the short focal length and high power required of lens 40, this lens is often formed by cementing two or more lower powered Fresnel lenses together.)

Figure 14:
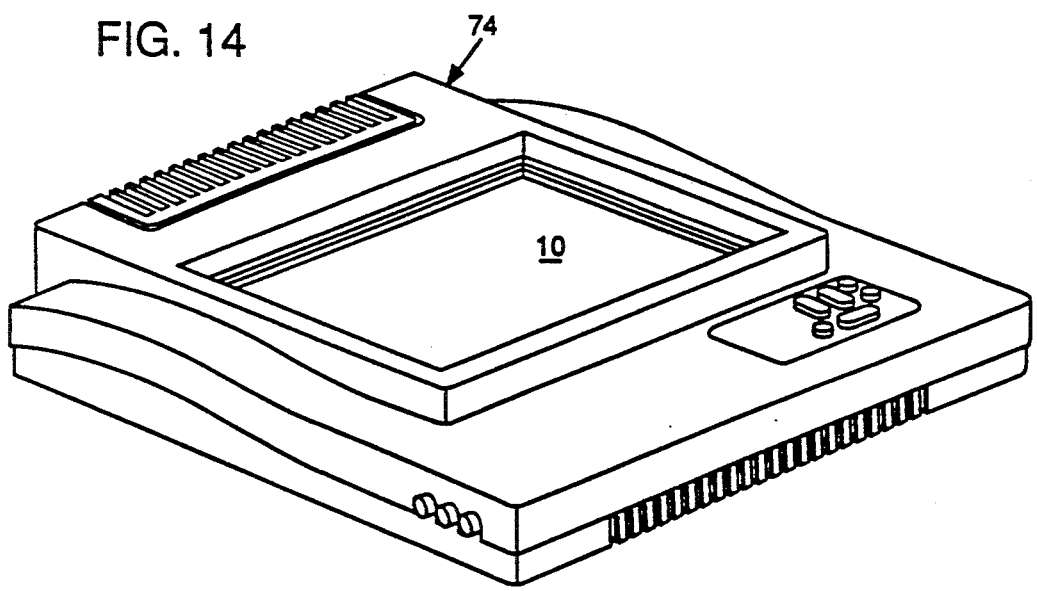
FIG. 14 is a perspective view of an integrated assembly including a display assembly and associated optics to facilitate use with an overhead projector.

When display subassembly 10 is used in such an embodiment, it is desirable to provide a Fresnel lens 44 to collimate the converging light from the projection surface 34 prior to illumination of the display subassembly. The light exiting the subassembly is then focused by a lens 46 (which is also desirably in Fresnel form) onto the projection lens assembly 42. (Lens 46 here serves the same purpose as the Fresnel lens 40 provided under the projection surface of the projector in the projector's normal operation, namely to focus light towards the projection lens assembly 42.) An integrated assembly 47 including both the display subassembly 10 and the Fresnel lenses 44, 46 is shown in FIG. 14.

In a second projection system embodiment 48, a portion of which is shown in FIG. 15, the collimating and focusing Fresnel lenses 44, 46 used in the FIG. 13 embodiment are omitted. Instead, the panels comprising the display subassembly are fabricated with different pixel spacings. The spacings on the various panels are selected so that corresponding pixels in the various panels are aligned with the converging light exiting the projection surface of the projector. By this arrangement, no accessory optics are required. Parallax effects are avoided since the internal optics of the display subassembly are designed to cooperate with the focused light used by the projector.

Projection technology may also be used to provide a self contained display in which an image is projected onto the rear of a viewing screen. A color monitor for a computer may be realized in this fashion. One such arrangement 50 is shown in FIG. 16. In this embodiment, a field lens 52 is used to collimate the light from bulb 54 prior to its passage through the display subassembly 10. The resulting image is projected by a second lens 56 onto a translucent medium 58 which can then be viewed from the opposite side by a user.

Direct View Systems

A display subassembly 10 according to the disclosed system can also be incorporated into a number of direct view display systems, such as color graphics displays for portable or laptop computers.

In direct view displays, it is usually desirable to backlight the display with substantially collimated light. On the viewing side of the display, it is generally desirable to provide exit optics that permit a wide viewing angle without parallax effects.

In a first direct view embodiment 60, shown in FIG. 17, the display subassembly 10 is backlit from a light source, such as a light panel 62. In such embodiment, entrance and exit optic elements 64, 66 generally collimate the light prior to entrance into the display subassembly and scatter the approximately-collimated light exiting the display. Each of optic elements 64, 66 may comprise a plate having formed thereon a plurality of microlenses 68, one aligned to each pixel. Light incident on one of the microlenses on element 64 is directed substantially normal to the plane of the subassembly and thus passes through the pixels of the component panels in the proper alignment, regardless of its initial orientation. Collimated light exiting the subassembly 10 is dispersed by the microlenses on the exit optic element 66, thereby permitting the color image to be viewed from a wide range of angles without parallax effects. The interstitial areas 69 between the lenses on exit optic 66 may be colored black to minimize stray light and to improve perceived contrast.

In other versions of the FIG. 17 embodiment 60, the arrays of microlenses can be replaced by arrays of fiber optic collimator faceplates or lenticular lenses.

Figure 18:
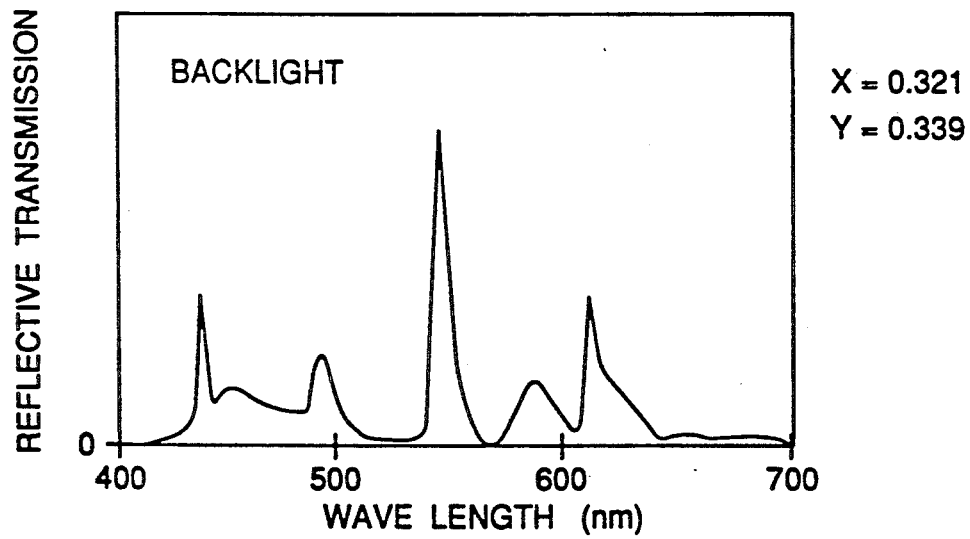
FIG. 18 shows the spectral distribution of a backlight that may be used with the display system of FIG. 17.

FIG. 18 shows the spectral distribution of a representative fluorescent backlight 62 that may be employed in the embodiment of FIG. 17. As is characteristic of fluorescent lighting, the spectrum has characteristic peaks corresponding to certain chemical components used in the light. These peaks (and the nulls) can be tailored to specific applications by changing the chemistry of the lamp.

Figure 19:
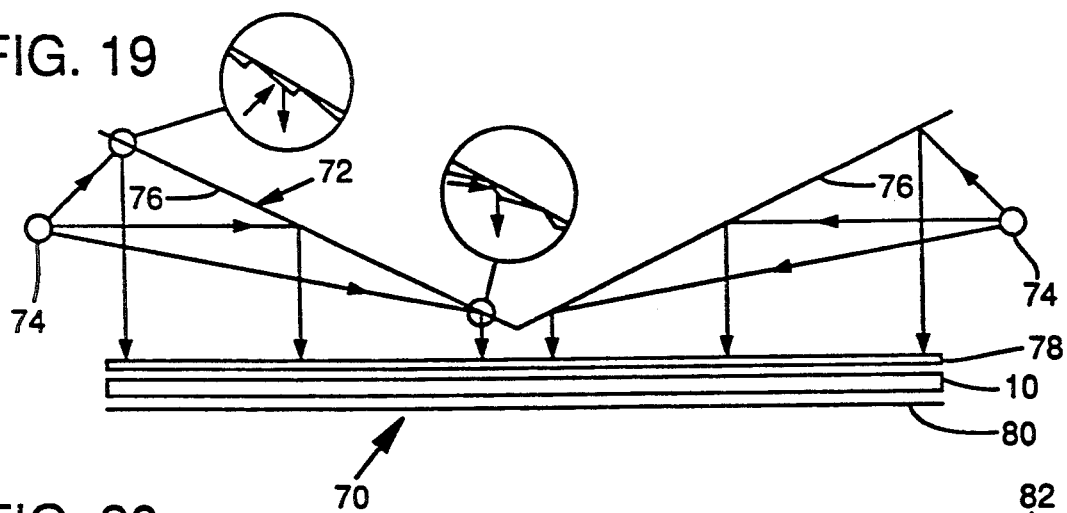
FIG. 19 shows a second direct view display system according to the disclosed system.

In a second direct view embodiment 70, shown in FIG. 19, the backlit illumination can be collimated by a novel arrangement employing a parabolic mirror 72 (desirably in Fresnel form). In this embodiment, a pair of linear light sources, such as fluorescent bulbs 74, illuminate a generally flat mirrored surface 76 that has facets arranged to provide one axis of collimation. The angles of the facets vary with placement on the surface to simulate a sectioned parabolic reflector. Light reflected from this mirrored surface is substantially collimated. However, to remove any stray off-axis light, a micro-venetian blind material 78, such as Light Control Film marketed by 3M Corp., is desirably placed between the mirror and the display subassembly. This material is a thin plastic film containing closely spaced black microlouvers to absorb light misaligned with respect to the louvers. Substantial collimation of the illuminating light is thus achieved.

In the FIG. 19 embodiment 70, a translucent light dispersing material 80, such as a ground glass plate or a commercially available diffusion material (i.e. Rolux film manufactured by Rosco of Port Chester, N.Y.) is mounted adjacent the exit side of the display subassembly 10 to display the resulting color image.

Figure 20:
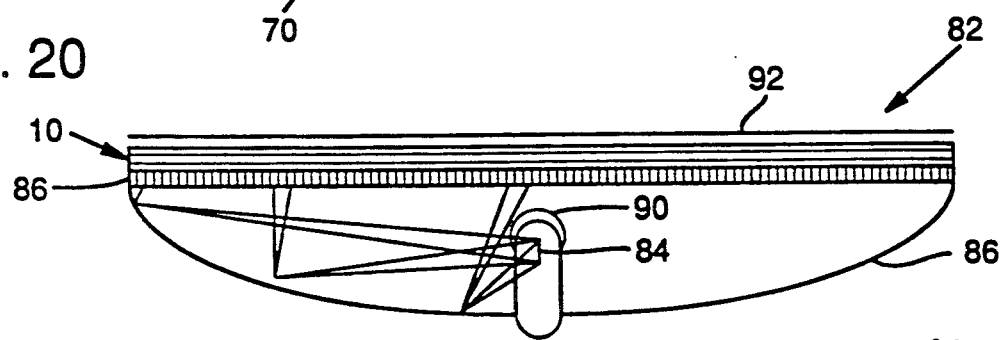
FIG. 20 shows a third direct view display system according to the disclosed system.

FIG. 20 shows a third direct view embodiment 82. In this system, the display subassembly 10 is illuminated by a tungsten-halogen lamp 84 that operates in conjunction with a curved reflector 86. The reflector is computer designed (using well known optical modeling programs or ray tracing techniques) to provide equal energy illumination to all regions of the display subassembly. A corrector plate 88, mounted adjacent the display subassembly, provides a normalization of illumination angle, i.e. perpendicular to the assembly.

The lamp 84 in the FIG. 20 embodiment is desirably part of a removable module that also includes a shield 90 for preventing direct illumination of the display subassembly by the lamp. Again, a diffuser material 92 is mounted adjacent the exit side of the display subassembly to permit direct, wide angle viewing.

Figure 21:
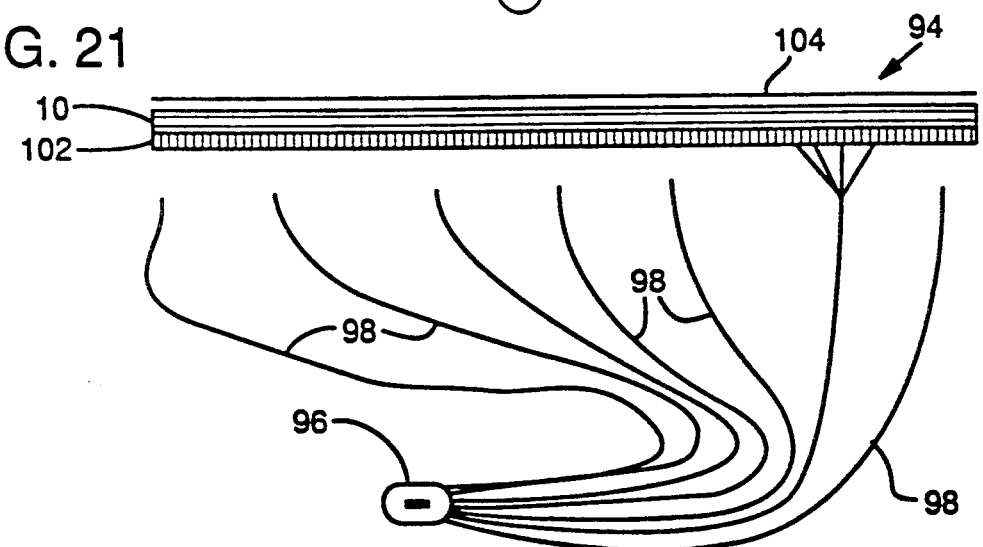
FIGS. 21 and 22 show a fourth direct view display system according to the disclosed system.
Figure 22:
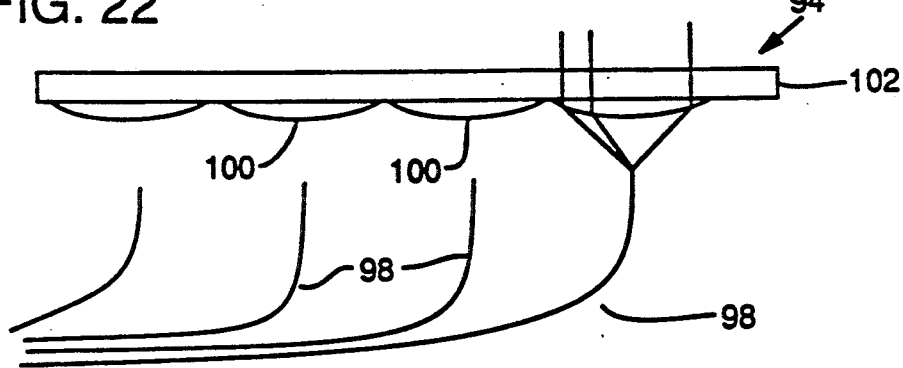

A fourth direct view embodiment 94 is shown in Figs. 21 and 22 and includes fiber optic backlighting of the display subassembly. In the illustrated system, a tungsten-halogen lamp 96 is again used, but this time is optically coupled to a bundle of optical fibers 98. Each fiber terminates at a microlens 100 on a plate 102 of such microlenses. These microlenses can be arrayed in a rectangular pattern on the plate 102, or can be arranged in a hexagonal pattern for higher density. In either event, the microlenses are matched to the dispersion patterns of the fiber so that light exiting the fibers is substantially collimated by the lenses. Again, a diffuser optic 104 is desirably positioned adjacent the exit side of the display subassembly.

In the FIG. 21, 22 embodiment, it is desirable that tolerance be provided for non-uniformities, and maximum use be made of all light, including paraxial rays. Fortunately, with the intimately contacting diffuser 104 on the top surface of the display subassembly, there is a reasonable "blur" tolerance. Some stray light can even be beneficial to "anti-alias" the jagged square pixels.

The above-described direct view displays may each be advantageously incorporated into a portable or laptop computer. "Portables" are generally considered to be computers that are sized for ready portability, but still require use of 120 volts AC from a wall outlet. They often take a suitcase-like form. "Laptops," on the other hand, generally rely on an internal rechargeable battery and often take a "clam-shell" form.

Figure 23:
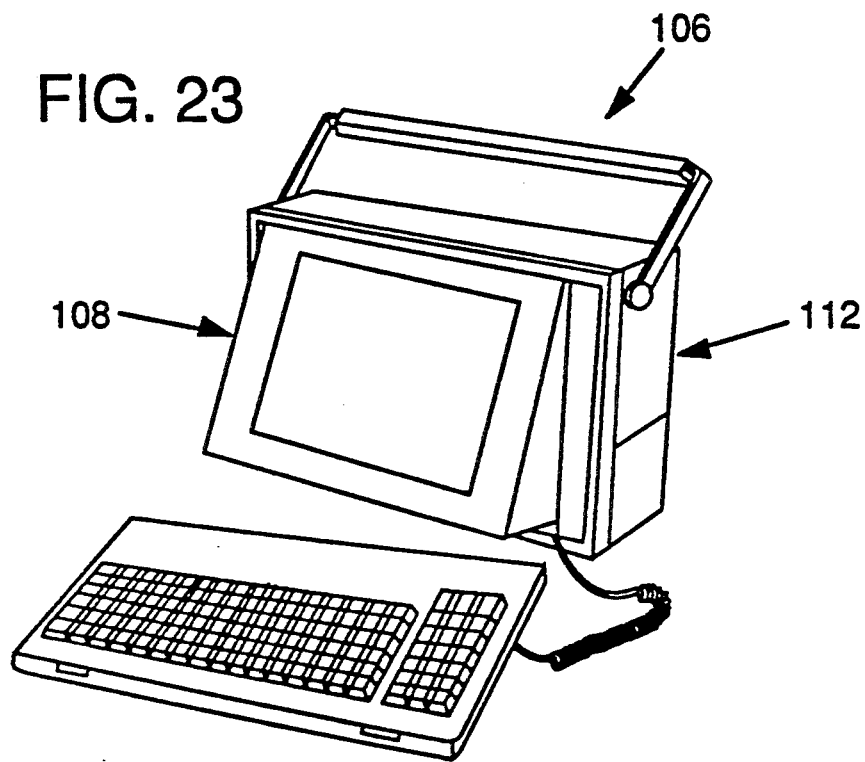
FIG. 23 shows a portable computer employing a direct view display according to the disclosed system.

FIG. 23 shows a portable computer 106 including a direct view display 108 according to the disclosed system. To operate the computer, the case 112 is opened and the display is positioned for viewing. (In some portables, the display is coupled to the computer by a coiled cable and can be positioned where desired.) When the computer is no longer needed, the display is packed into the case, secure against abuse.

Figure 24:
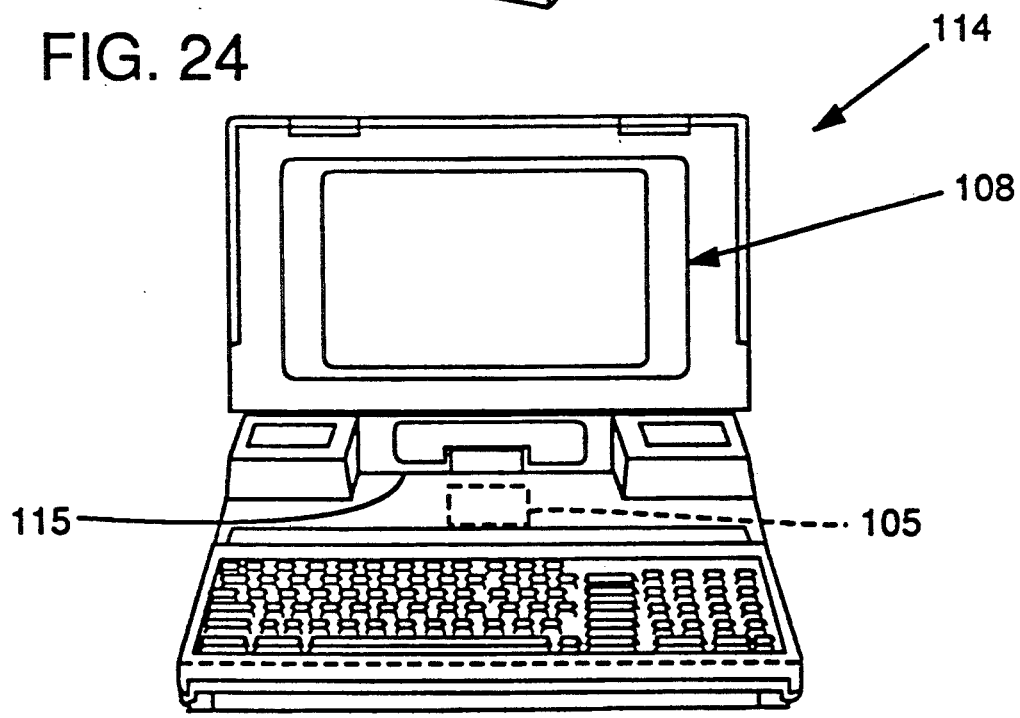
FIG. 24 shows a laptop computer employing a direct view display according to the disclosed system.

FIG. 24 shows a laptop computer 114 including a direct view display 108 according to the disclosed system. As can be seen, the display is coupled to the remainder of the computer by a hinge arrangement 115. The laptop's internal rechargeable battery 105 powers both the computer and the display.

Again, to operate the computer 114, the hinged display 108 is lifted, exposing it for viewing. When the computer is no longer needed, the hinged display is secured in its collapsed position, protecting it from abuse.

Figure 25:
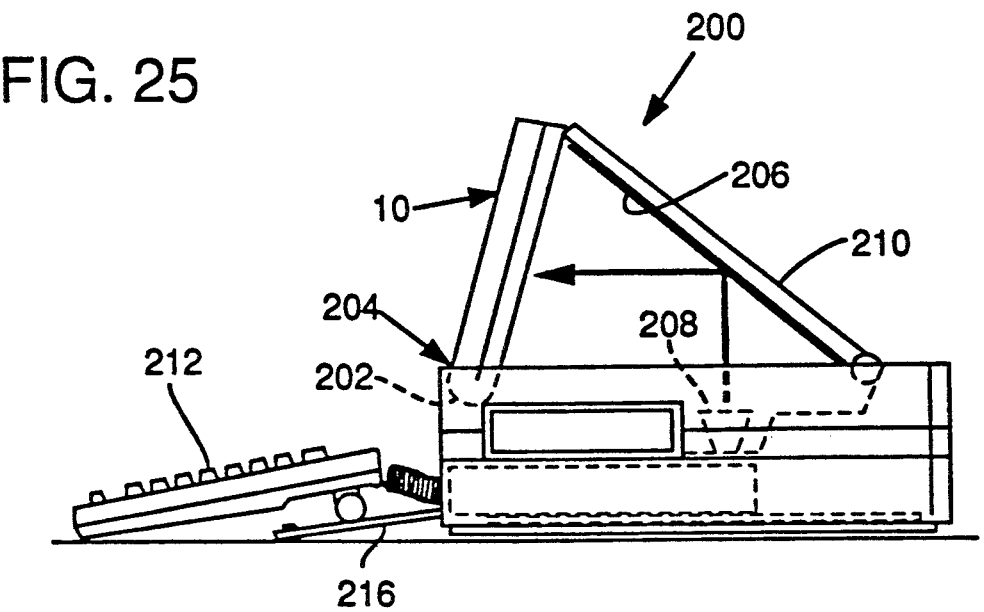
FIG. 25 shows a portable computer including a direct view display according to one embodiment of the disclosed system.
Figure 26:
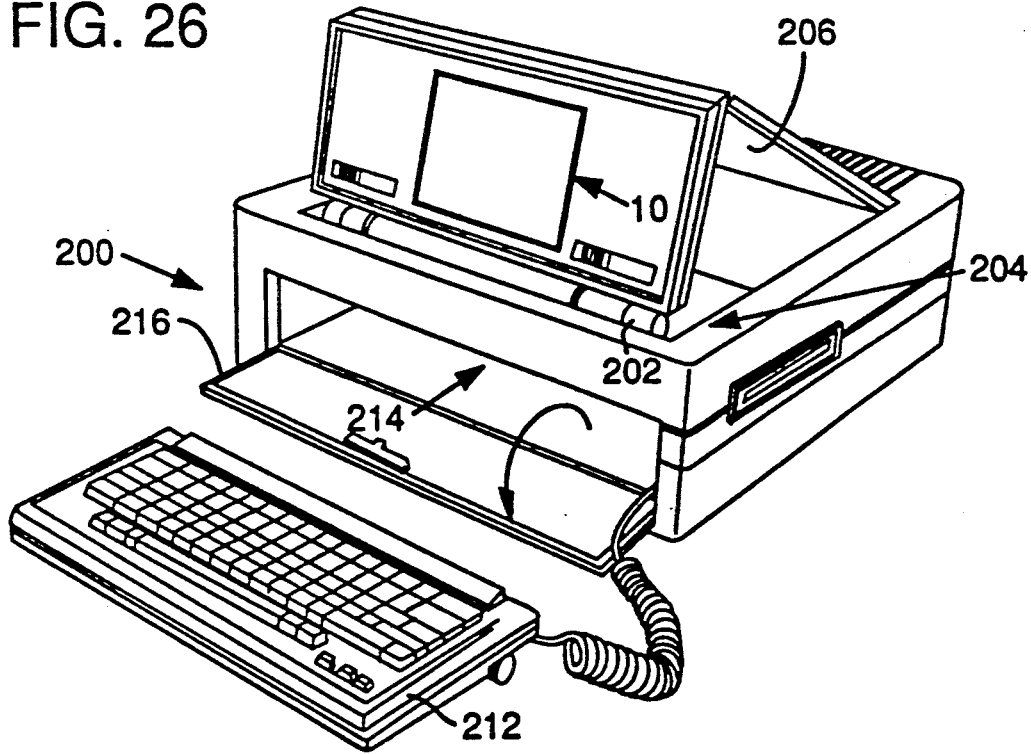
FIG. 26 is a perspective view of the portable computer of FIG. 25.

FIGS. 25-30 illustrate a variety of other portable computer designs that are adapted for use with a display subassembly according to the disclosed system. In FIGS. 25 and 26, a computer 200 includes a display subassembly 10 mounted by a hinge 202 to the front top edge of a computer case 204. When in use, the display subassembly 10 is illuminated by light reflected off a mirrored surface 206 from a lamp 208. The lamp 208 is a point source (i.e. it has a relatively small physical extent, such as a small filament) and is fixedly attached to the body of the computer case 204. The diverging light from this point source is collimated by a flat lens (not particularly shown in the figures) mounted adjacent the display subassembly.

To fold for storage, the display subassembly 10 on computer 200 pivots rearwardly into the body of the computer case, and the panel 210 to which the mirrored surface is attached folds down over the display, protecting it from abuse. The computer keyboard 212 slides into a recess 214 in the front portion of the computer case and a door 216 closes to secure the keyboard in place.

Figure 28:
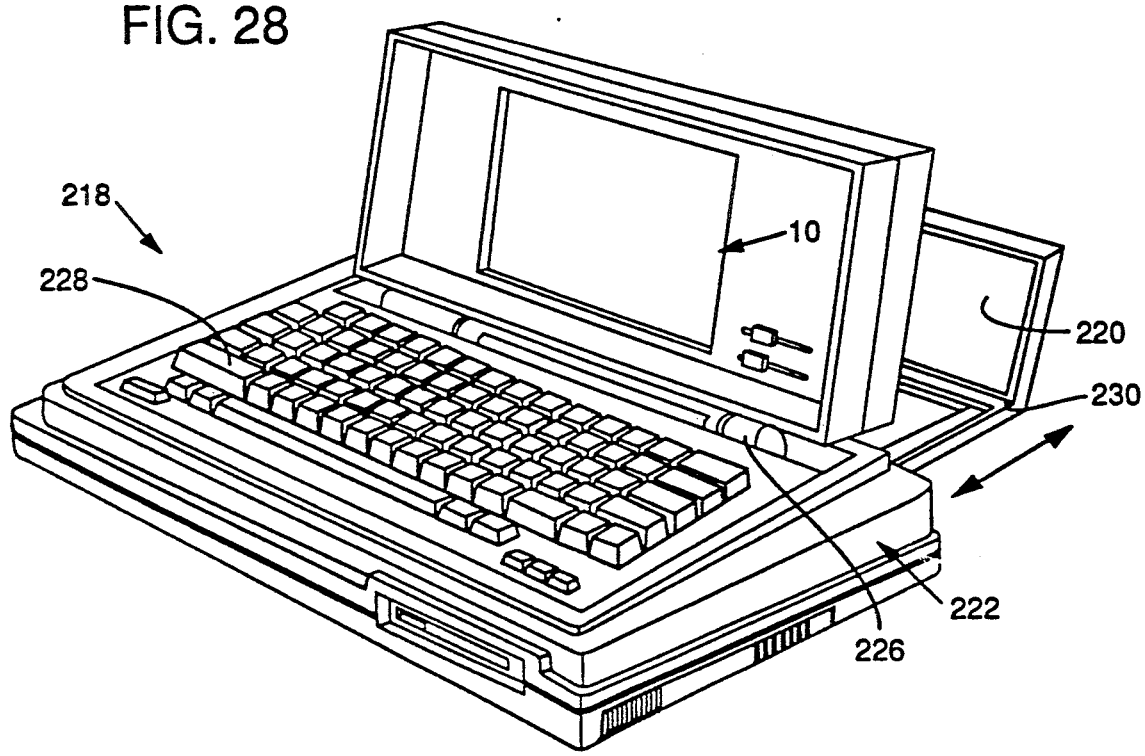
FIG. 28 is a perspective view of the portable computer of FIG. 27.
Figure 27:
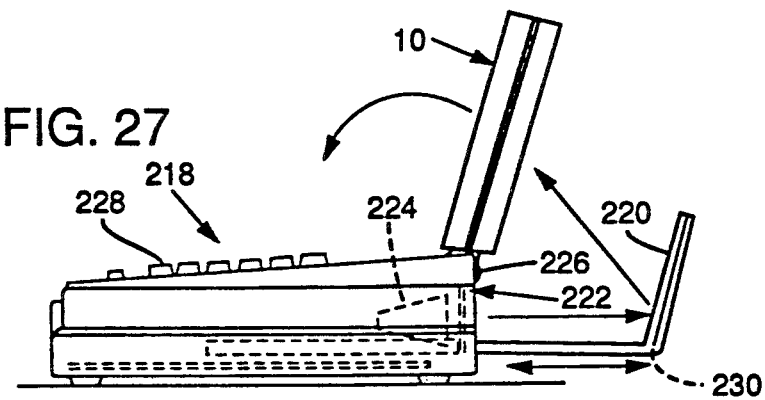
FIG. 27 shows a portable computer including a direct view display according to another embodiment of the disclosed system.

FIGS. 27 and 28 show a portable computer 218 in which the display subassembly 10 is illuminated by light reflected from a mirror 220 that slides out the back of the computer case 222. Again, the illumination is provided by a point source, such as a tungsten-halogen bulb 224 that is mounted to the computer case 222 rather than to display subassembly itself.

In operation, the display subassembly is positioned in a substantially vertical orientation on a hinge 226 at the rear top portion of the case. To collapse for storage, the display subassembly folds forwardly and latches in place over the keyboard 228. The mirror 220 is slid towards the case and locks with the mirrored surface adjacent the case's back side. (In another embodiment, the mirrored surface is small enough to be positioned entirely within the computer case. In still another embodiment, the illustrated mirror is hinged at point 230, permitting it to be folded flat and slid entirely within the computer case.)

Again, a flat correction lens is desirably mounted on the rear of the display subassembly to collimate the light reflected from the mirror 220.

Figure 30:
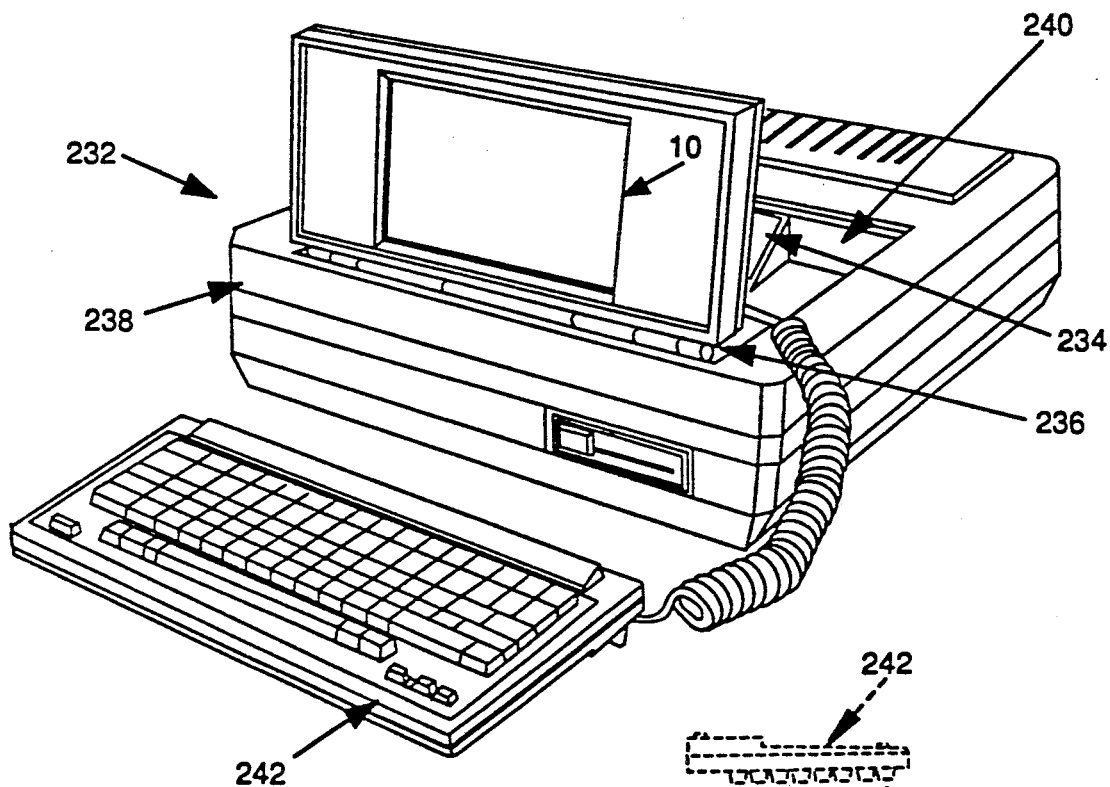
FIG. 30 is a perspective view of the portable computer of FIG. 29.
Figure 29:
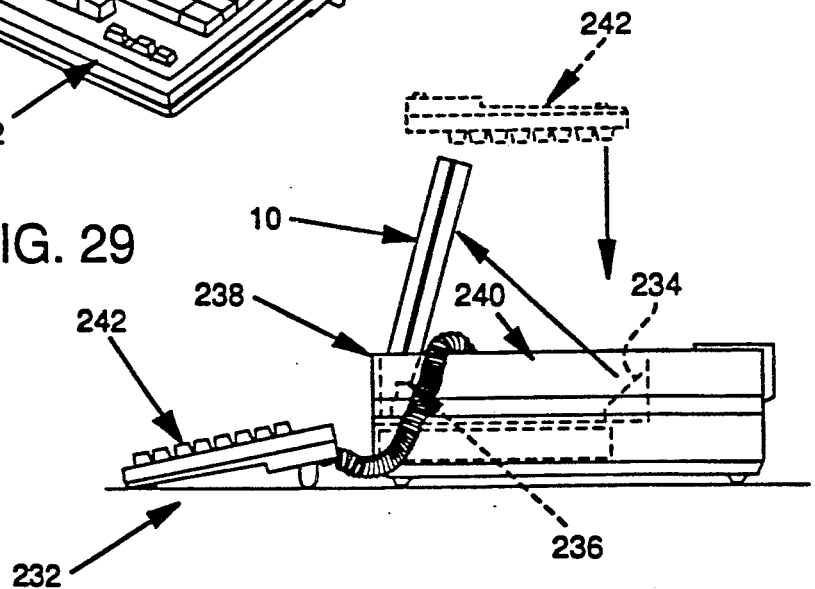
FIG. 29 shows a portable computer including a direct view display according to yet another embodiment of the disclosed system.

FIGS. 29 and 30 show a portable computer 232 in which the display subassembly is directly illuminated from a point source 234, without an intervening mirror. In this embodiment, the display subassembly 10 is again attached by a hinge 236, this one in a cavity 240 in the front portion of the computer case 238. In use, the display subassembly 10 is positioned substantially vertically and is illuminated by the point source 234. To fold for storage, the display subassembly 10 folds rearwardly into the cavity and is held secure by the keyboard 242, which is inverted and latched into place to serve as a top cover.

Figure 34:
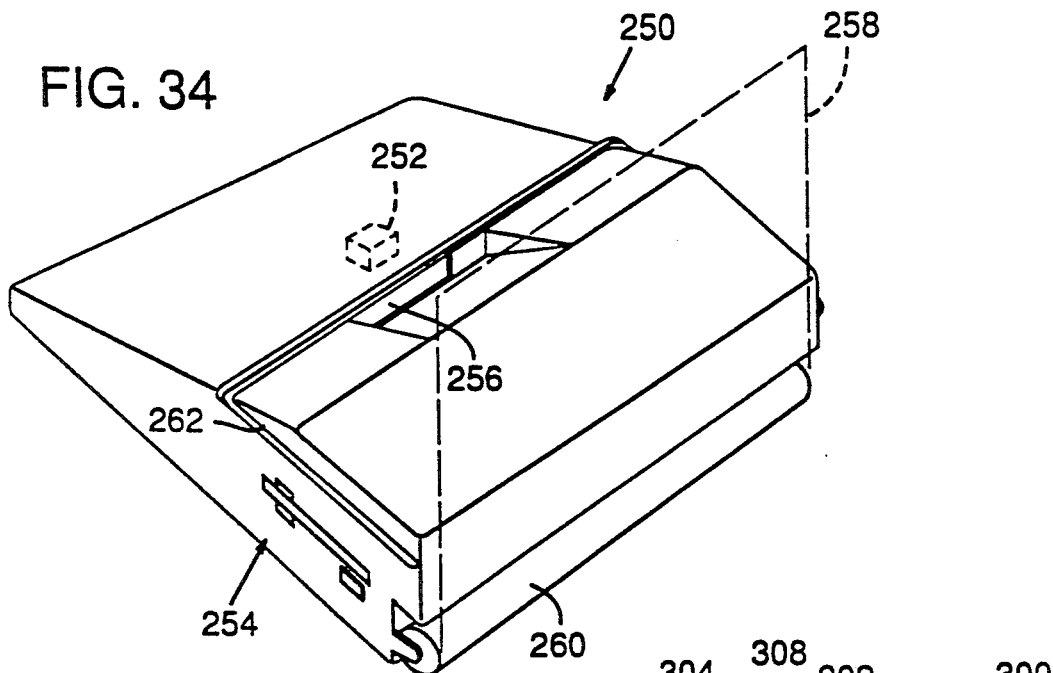
FIG. 34 shows a computer with a roll-up screen according to the disclosed system.

FIG. 34 shows yet another computer 250 according to the disclosed system. In computer 250, a point light source 252 is disposed within a case 254 and illuminates a display subassembly 256, which fills an aperture formed in the case. An image formed by projection of light through this display subassembly is projected on a screen 258 positioned at the back of the computer case 254. In the illustrated embodiment, the projection screen is flexible and is rolled for storage about a spring-loaded roller 260 disposed at the bottom rear portion of the computer case. To erect the screen for viewing. a screen support 262 is pivoted upwardly from its collapsed storage position to an upright position at the back of the computer. The unrolled screen can then be fastened to the screen support by one or more clips, or like means (not shown).

It will be recognized that in all of the foregoing embodiments, the pixel pitches on the various panels may be made different (as shown in FIG. 15) to align the pixels with the orientation of the incoming light. By such a construction, it is not necessary to collimate or otherwise process the light prior to illumination of the stacked subassembly. It will further be recognized that a color method can be practiced by simply illuminating a stack of uniformly pitched panels with uncollimated light, although parallax effects may cause improper pixel registration, blur and false color edges.

Figure 31:
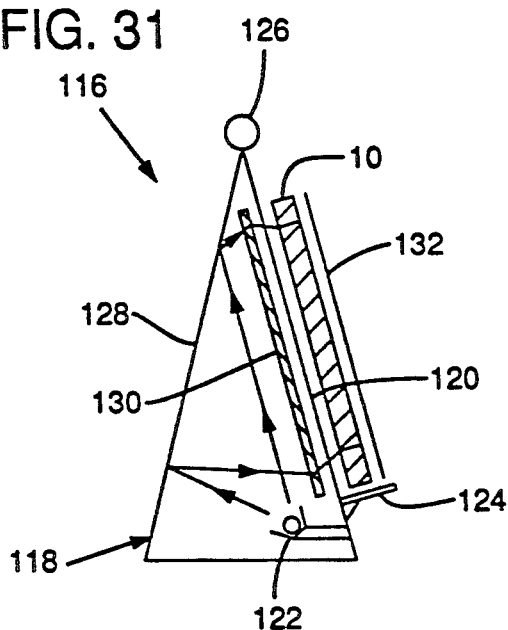
FIG. 31 shows a display stand that permits a display subassembly to be backlit for direct viewing.

FIG. 31 shows a final embodiment 116 illustrating use of a display subassembly 10 according to the disclosed system in a direct view display. In this embodiment, the display subassembly is removably positioned on an illumination stand 118 for direct viewing. The illumination stand 118 has a light-transmitting surface 120 against which the display subassembly can rest, and an internal light source 122 for directing illumination therethrough. A small shelf 124 on which the display can be positioned is provided on the exterior of the stand.

The stand 118 is desirably collapsible to permit ready portability. This can be achieved with a hinge and bellows arrangement 126. Small size can be maintained by using folded optics that include mirroring on the inside back wall 128 of the stand.

The stand may be provided with optics that emulate the optics of a conventional overhead projector. That is, these optics may focus light incident on the display 10 so that it converges on a point a short distance away. In the illustrated embodiment, these optics may comprise a Fresnel plate lens 130. In such case, the Fresnel entrance optic 44 used in the FIG. 13 projection system embodiment may be used to collimate the focused light prior to its illumination of the display subassembly.

In this embodiment, the exit optic 132 is again a simple translucent dispersion medium to permit wide angle viewing of the collimated image.

It will be recognized that the viewing stand 118 advantageously permits an LCD display to be used either as a projection device for large audiences (i.e. as an "electronic transparency"), or as a single-user computer screen.

Systems with Split Optic Paths

While the foregoing discussions have been directed to display subassemblies comprised of single stacks of panels, additional advantageous results can sometimes be achieved by splitting the stack into two or more substacks and illuminating each separately. One such arrangement is shown in FIG. 32.

Figure 32:
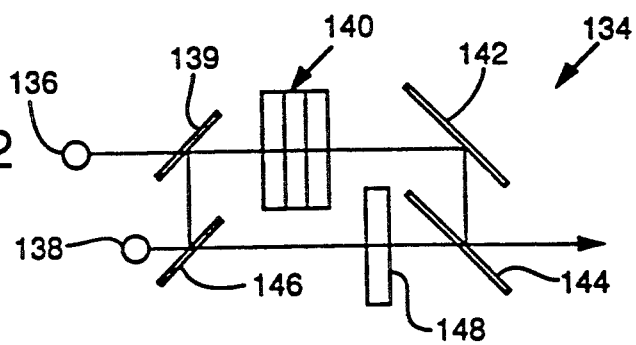
FIG. 32 shows a display system employing two light sources and two optical paths according to the disclosed system.

In the FIG. 32 arrangement 134, the stacked panels are split into two sub-stacks to permit illumination by two different light sources. The first light source 136 is a tungsten-halogen incandescent lamp, which produces a spectrum that is strong in red, especially when the lamp's operating voltage is decreased, which may be desired to increase the lamp's life. The second light source 138 is a mercury arc-lamp, which produces a spectrum rich in deep blue light (430 nm), with a large amount of energy also in the mid-green (540 nm) portion of the spectrum. The complementary spectrums produced by these two light sources are advantageously combined in the embodiment of FIG. 32 to achieve good brightness, long lamp life and high color temperature "white."

As shown in FIG. 32, light from the tungsten-halogen lamp 136 follows a first optical path that includes a holographic or dichroic mirror 139. (This mirror may be designed to pass all of the spectrum except a narrow notch [20 or 30 nm] at 540 nm.) This filtered light continues on to illuminate a stacked assembly 140 that includes red- and green-controlling panels (i.e. "cyan" and "magenta"). (For clarity of presentation, the polarizers, collimator, and other optical elements used in this stack and elsewhere in the FIG. 32 embodiment are not illustrated. Following the logic discussed above, the entrance polarizer on the magenta panel may be red, the exit polarizer on the cyan panel may be green, and the intermediate polarizer may be neutral.) The light exiting the stacked assembly 140 is reflected off mirrors 142 and 144 and is directed to exit optics for projection or direct viewing. The tungsten-halogen light 136 thus provides illumination at the red and green portions of the spectrum, and the stacked assembly 140 controls these colors.

Light from the second, mercury arc-lamp 138 follows a second optical path towards a dichroic mirror 146, which reflects green light up to mirror 139 (for additional illumination of the red/green control stack 140) and passes blue light into a blue controlling (i.e. "yellow") LCD 148. The light exiting this blue LCD continues to and through the mirror 144, joining with the red and green light and continuing to the exit optics. A full color image is thus produced.

(It will be recognized that splitting the light in this fashion provides some design freedom, viz., that the red-and green-controlling panels can be tuned without regard to their blue performance [since they encounter no blue light] and the blue-controlling panel can be similarly tuned without regard to its red and green performance.)

If increased contrast is desired, a black/white panel may be included in either the first or second optical paths. Alternatively, an additional magenta (i.e. green controlling) cell may be included in the stack 140 since green is the dominant contributor to photopic brightness.

While the FIG. 32 embodiment provides different optical paths for different portions of the optical spectrum, in other embodiments the different optical paths can be dedicated to different polarizations of light. Such split-by-polarization systems offer improved brightness since the cross-polarized light that is filtered from single path systems is instead directed to a second path where it is utilized.

Figure 33:
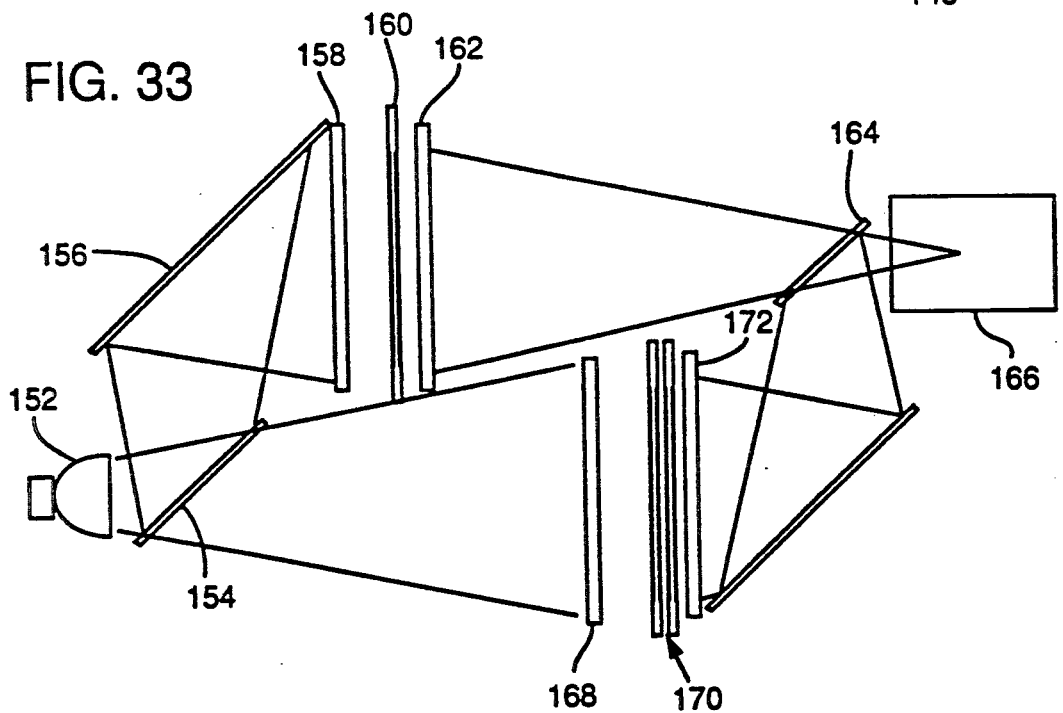
FIG. 33 shows a display system employing one light source and two optical paths according to the disclosed system.

FIG. 33 shows a system 150 similar to that of FIG. 32, except the FIG. 33 system uses a single light source 152. Blue light from this light source is stripped off by a dichroic mirror 154, reflected off a mirror 156, collimated by a collimator 158, and directed into a blue controlling LCD assembly 160. Light exiting this LCD assembly is focused by a lens 162 through a blue-passing mirror 164 and into a lens 166 for projection onto a viewing screen.

The red/green light from lamp 152 passes through mirror 154, is collimated by a collimator 168, and illuminates a stack 170 that includes cyan and magenta panels (which control red and green light, respectively). The light exiting the stack 170 is again focused by a lens 172, reflected off the mirror 164 and directed into the projection lens 166.

Other Stacked Cell Embodiments

Figure 35:
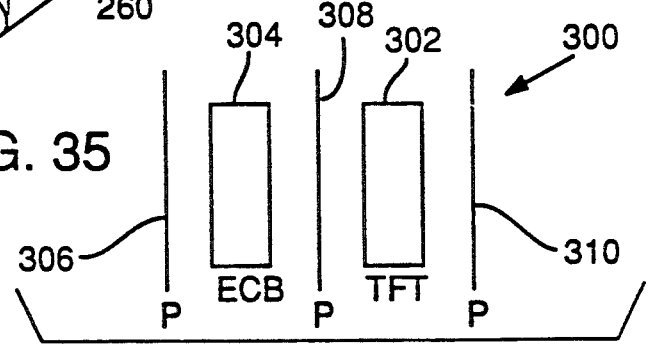
FIG. 35 shows a display subassembly using a thin film transistor (TFT) LCD panel in conjunction with an STN panel.

While the foregoing description has focused on a single class of embodiments that incorporate supertwisted nematic panels, it will be recognized that a variety of other embodiments can be constructed using different display elements. Exemplary is the display 300 shown in FIG. 35. In this display, a thin film transistor (TFT) liquid crystal panel 302 is operated in conjunction with an optical element 304 that exhibits an electrically controllable birefringent (ECB) effect. (Thin films transistor panels are known in the art and disclosed, inter alia, in U.S. Pat. Nos. 4,821,092, 4,819,038, 4,816,885, 4,776,673, 4,743,099, 4,743,098, 4,723,838, 4,715,930, 4,654,117, 4,649,383, 4,636,038, 4,621,260, 4,599,246, 4,591,848, 4,581,619, 4,461,071, 4,386,352, 4,385,292, 4,299,447 and 3,824,003.)

In the illustrated embodiment, a limited birefringence mode liquid crystal effect may be given to the TFT panel by adding a retardation film to the (90°) TN of a standard TFT-LCD and by selecting the polarization orientation appropriately.

In preferred embodiment, the TFT 302 is optimized for whitest white (instead of blackest black). The TFT is also tuned to broaden the dip in the spectral transmissivity curve and place it at the appropriate wavelength required by the stacked combination of panels. In some such embodiments, a double dip in this curve may be obtained by use of a retardation film. By providing several layers of retardation film, ideal "notch filter" performance may more nearly be achieved.

The ECB element 304 may be a supertwisted nematic panel detailed earlier, or may comprise a conventional twisted nematic cell, or a great variety of other elements, such as electro-optic, electro-acoustic, phase change, or ferroelectric cell. (STN cells have generally not been used in a classical electrically controlled birefringence mode due to the very restricted range of operating voltages dictated by multiplexibility requirements. Rather, they have been operated in a bistable mode, operating in either the select or non-select states, not in between. The FIG. 35 embodiment of the disclosed system can exploit the voltage-dependent birefringence exhibited by STN cells within the narrow R.M.S. operating range between $V_{select}$ and $V_{non-select}$ to achieve a broad range of intermediate birefringent colors.)

The illustrated TFT panel 302 and ECB panel 304 are sandwiched between three polarizers 306, 308 and 310. The subtractive coloration provided by each pixel in the ECB display element 304 is a function of the signal driving that pixel. The range of colors produced by this variable birefringence is augmented by one or more additional colors attainable by use of the TFT panel 302 to produce a full color display.

Figure 36:
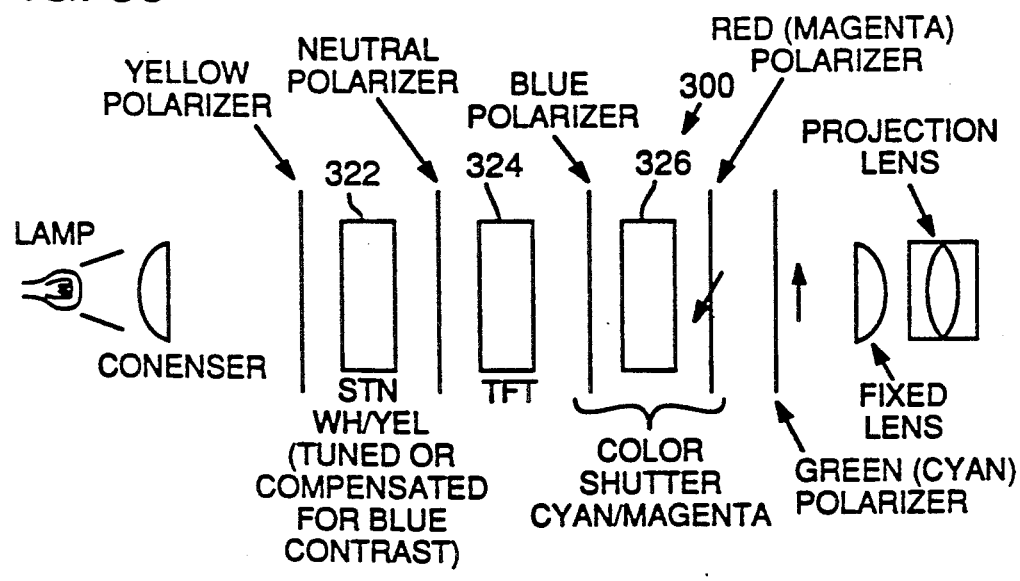
FIG. 36 shows a display subassembly using a TFT panel, an STN panel, and a color shutter.

A related embodiment is shown in FIG. 36. In this figure, a display subassembly 320 comprises a white/yellow mode STN (or DSTN) panel 322, a thin film transistor panel 324 and a color shutter assembly 326 in stacked arrangement with associated polarizers. (Color shutter assemblies are known in the art and are described, inter alia, in U.S. Pat. Nos. 4,758,818, 4,726,663, 4,652,087, 4,635,051, 4,611,889 and 4,582,396.)

In the illustrated display subassembly 320, the color shutter is operated in alternate frames to block red and green light, respectively (thus giving the appearance of cyan and magenta). The TFT provides a very fast switching speed. The STN cell 322 is relatively slower than the TFT, but the blue light it controls is relatively less perceptible to the human eye, so the slower response speed is of little significance.

The FIG. 36 embodiment is intended to lower the costs associated with making a high-information content full color LCD based display system. This embodiment requires only one (monochrome) TFT panel, as opposed to three that may otherwise be used to control red, green and blue.

The STN 322 may be grey-scaled, using a single bit plane of RAM, to 8 or 16 levels. It can provide sufficiently fast response time for moving images.

The TFT 324 is operated at twice the normal frame rate (i.e. greater than or equal to 120 Hz) and, along with the color shutter 326, controls the red and green image fields sequentially. Both the color shutter and the TFT (with their associated polarizers) are tuned to leak blue all the time, thereby improving the color balance, especially when a tungsten-halogen lamp is used.

Figure 37:
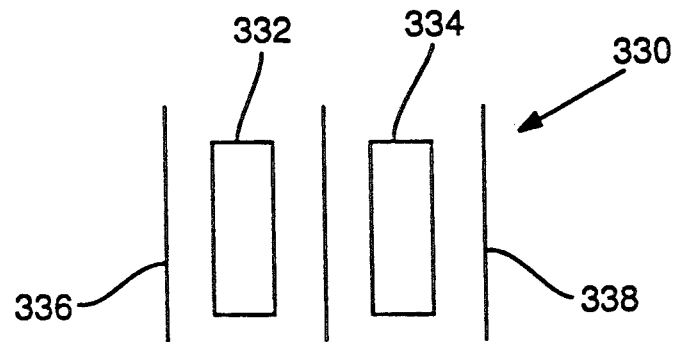
FIG. 37 shows a display subassembly using two panels.

In still another embodiment of the disclosed system, two LCD panels may be stacked and operated independently to produce a full gamut of colors. A display assembly 330 according to this construction is shown in FIG. 37. For expository convenience, the panels will be referenced as STN panels 332, 334, although again, a variety of other technologies can be used.

STN panels 332 and 334 are fabricated with a higher value of $\Delta nd$ than those STN panels illustrated earlier. An exemplary panel may have a 240 degree twist angle, with a $\Delta nd$ value of 1.4. The larger $\Delta nd$ value produces a wider variation in the voltage variable coloration effect. When a high information content, multiplex-addressed LCD panel is grey-scaled (either by PWM or multiple frame averaging), intermediate voltages (between $V_{select}$ and $V_{non-select}$) can be attained on each pixel, despite the nearly-bistable switching behavior that characterizes STN cells.

Figure 38:
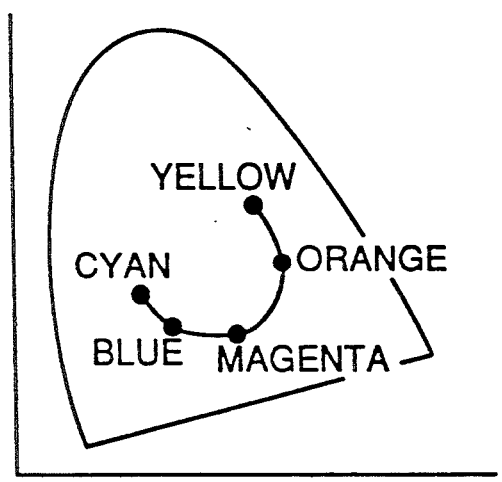
FIG. 38 illustrates a possible color gamut produced by one of the panels of FIG. 37.

Between neutral polarizers, the first panel 332 can obtain, for example, the color gamut shown in FIG. 38. By using a blue (ideal characteristic, pure blue leakage only) polarizer, the gamut is as illustrated in FIG. 39, instead.

As can be seen, the color gamut with the blue polarizer is shifted towards the blue, with the result that "yellow" cannot be obtained, but "white" is obtained instead. The "blue" may not be as pure as desired ideally, but human-factors experts suggest that a desaturated blue is better for communicating visual information.

Figure 39:
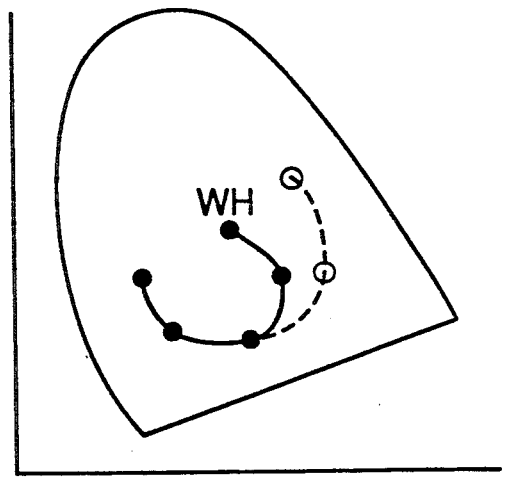
FIG. 39 illustrates the gamut of FIG. 38 after being analyzed with a blue polarizer.
Figure 40:
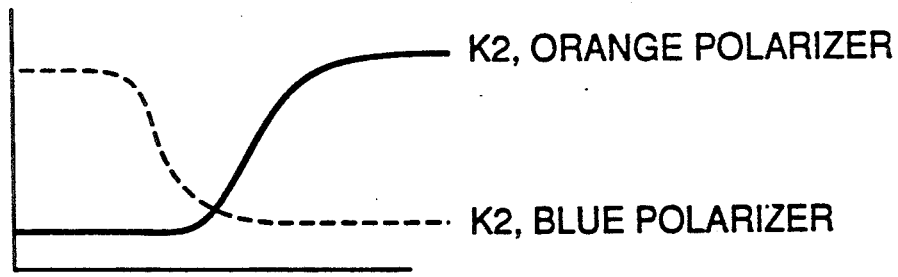
FIG. 40 illustrates the spectral characteristics of two possible polarizers used in the display subassembly of FIG. 37.

If the first polarizer 336 is dyed blue, producing the color gamut shown in FIG. 39, the second panel 334 needs only to be able to make yellow and white to make the full gamut of saturated primary and secondary colors. To be safe and insure a true black state, the leakages of the first and third polarizers 336, 338 must not overlap, so rather than choose a yellow polarizer for polarizer 338, it is somewhat preferable to choose an orange polarizer instead (FIG. 40). Of course, by tuning the Δnd of the LCD and, optionally, adding additional layers of birefringent material (such as retardation films), various birefringence colors can be made within each layer. A desirable display according to this embodiment has the following characteristics:

1) good white and black states (overall contrast ≧ 10:1);

2) good color saturation (especially redness of red); and 3) extra good blue light transmission to counteract tungsten illuminant (to raise the color temperature, i.e. color correction).

By using various commercially available color polarizers, the display subassembly can be optimized for various purposes and with different performances for different needs.

Other possible complimentary pairs of colors for polarizers 336 and 338 are cyan and red, green and red, green and violet, green and magenta, and green and blue.

The magenta formed by electrically controlled birefringence is generally poor, because the red edge is too soft and must be supplemented. Thus, a red polarizer is desirable, which provides excellent sharpness (i.e. steepness of edge between yellowish-green and red). The gamut of the first LCD 332 may thus be, inter alia, one of the following:

a) red/magenta/white;
b) red/yellow/white; or
c) magenta/yellow/white.

In these cases, the second panel 334 should subtract red, at least, so cyan is its chief color and it may attain one of the following:

d) cyan/magenta/white;
e) green/cyan/white;
f) cyan/green/yellow/white; or
g) blue/cyan/white.

Preferred combinations include a+f, b+g or c+d, above.

While the display subassembly 330 has been described as operating in a color subtractive mode, it will be recognized that the display may also be operated in an additive mode, either with adjacent pixels being operated together to add spatially, or with a single pixel in the stacked assembly being operated with alternate colors to add temporally.

If both liquid crystal panels 332, 334 are tuned to produce four distinct shades of color, they can be operated cojointly to produce sixteen colors and minimize the need for grey scaling.

Of the foregoing combinations, the presently preferred is to tune panel 332 to produce a color gamut extending from magenta, through yellow to white, and dye polarizer 336 red. Panel 334 can be tuned to produce a color gamut extending from cyan, through green and yellow to white, and polarizer 338 can be dyed green. Again, partial compensation can be used to optimize the various colors produced.

Additional Remarks

It will be recognized that the use of colored polarizers with birefringent cells provides a great deal of design freedom. The reason is that a colored polarizer renders the response of a cell at certain wavelengths irrelevant. Taking as an example a magenta (green blocking) cell, the cell must normally be optimized for a number of factors: high transmissivity of blue light in both the select and deselect states, low transmissivity of green light in the select state but high transmissivity of green light in the deselect state, and high transmissivity of red light in both states. Such optimization typically requires a compromise of all factors. When used in conjunction with a magenta polarizer, however, the cell's transmissivity at blue and red becomes only a minor concern. The magenta-dyed polarizer causes the cell to pass blue and red regardless of the characteristics of the cell. With the importance of these factors minimized, the design of the cell can focus on just one factor—high contrast between the select and deselect states for green—and no compromises need be made.

In optimizing the response of the cells, it is sometimes desirable to use additional optical components. For example, in order to tune the range of birefringence effects it is sometimes desirable to include retardation films or other passive compensation layers adjacent the cells.

Figure 2:
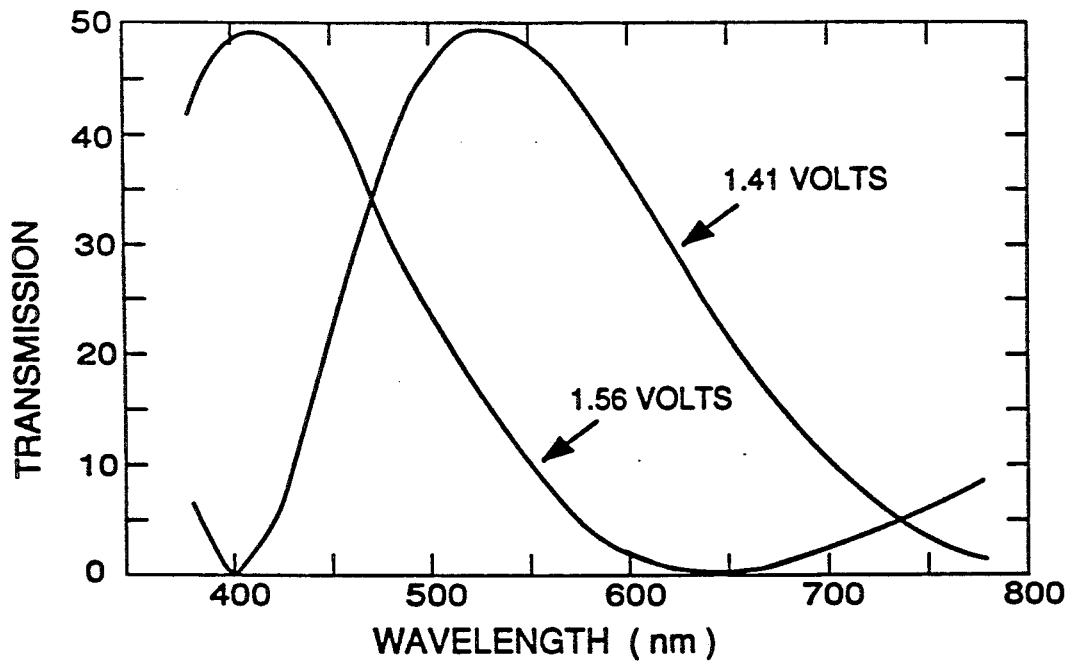
FIG. 2 shows the transmission spectrum of a representative STN cell when operated in its select state (with an excitation voltage of 1.56 volts) and in its deselect state (with an excitation voltage of 1.41 volts).

A birefringent cell, operated in conjunction with a neutral polarizer, exhibits a sinusoidal transmissivity versus wavelength curve, as was shown in FIG. 2. Taking again the example of a magenta (green blocking) cell, the cell's Δnd is selected so the minimum of its sinusoidal curve falls somewhere in the green portion of the spectrum. This minimum, however, may be relatively narrow, permitting relatively large amounts of higher and lower wavelength green light to pass through the cell/polarizer combination. To broaden this "notch" in the transmissivity curve, a retardation film may be employed. While retardation films are generally used to tune the cell's characteristics (i.e. to move the dip in the curve up or down in wavelength), the film's action in reversing part of the cell's twist also serves to broaden the dip somewhat. Thus, the transmissivity curve of the magenta cell in its deselect state may be made to more nearly approximate the ideal (i.e. a rectangular notch that encompasses all of green-500 to 600 nm.).

While the display subassembly has been described as including single supertwisted liquid crystal panels, other types of birefringent optics can alternatively be used. These may include reverse twist-compensated STN cells that are operated with a passive birefringent layer (which may either be a conventional anisotropic medium or a passive reverse-twisted STN cell) to add a desired birefringent effect. (Reverse-twist compensated STN cells may include DSTN cells, or STN cells operated in conjunction with passive optical retardation mediums that have a reverse twisting effect on the birefringent STN cells. Both of these constructions operate to minimize the effective birefringence of the STN cells theremselves, so the desired birefringent effect is introduced by the passive birefringent layer with which the compensated cells are operated.) Still other birefringent optics suitable for use in the disclosed system include panels embodying other technologies (such as electro-optic [i.e. lithium tantalum niobate], acoustic-optic, ferroelectric, or PZLTT cells). A higher resolution color display can be achieved by stacking two or more cells, with the active lines on one cell not overlapping active lines on the other, as described below. Faster switching times can be achieved by stacking several thin panels for each color, as disclosed in U.S. Pat. No. 4,547,043. The basic principles disclosed herein are also applicable to other display technologies, such as interference color systems.

In other embodiments, certain birefringent panels may be stacked without intervening polarizers. For example, two panels (with or without different Δnd) may be stacked without an intermediate polarizer to produce white, yellow, green and cyan in the four combinations of select states. A green polarizer can be used on the outside layer, since green is common to all these colors. Such an embodiment is especially valuable for a white, magenta, cyan and blue combination, since overhead projection needs more blue throughput, which may be obtained by use of a "pure blue" polarizer.

In still other embodiments, if any of the LCD birefringence colors are not ideal, some attenuation of specific light wavelengths might enhance the color gamut and overall contrast. For example, two polarizers might be used together, or a weak color filter compensator (i.e. a conventional gelatin filter) might be added.

It will be recognized that grey scaling techniques can readily be applied to the disclosed system to provide the full gamut of possible colors. In one such embodiment, grey scaling is applied to each of the three colored cells. In another embodiment, grey scaling is applied simply to a fourth (typically black) cell included in the stack. U.S. Pat. Nos. 4,908,613, 4,888,599, 4,873,516, 4,864,290, 4,861,143, 4,840,462, 4,840,460, 4,818,078, 4,766,430, 4,743,096, 4,709,995, 4,560,982, 4,508,427, 4,427,978 and 4,043,640 teach various grey scaling techniques.

It will further be recognized that a color display may be formed with more or less panels than the three or four illustrated. For example, it is advantageous to provide laboratory instruments, such as oscilloscopes and analyzers, with displays formed by stacking two supertwisted birefringent panels with one or more colored polarizers. The display may take virtually any of the forms discussed above and still be suitable for inclusion in the instrument. While color gamut is compromised somewhat by such a two panel stack, brightness is increased and cost is reduced.

Finally, it will be recognized that many advantageous results can be achieved by conjointly operating several TFT panels, either in stacked or split-optic arrangement, rather than including a single TFT panel in a stack with other panels, as particularly discussed above. Some such embodiments, including certain of the split optic path embodiments, do not rely on exploitation of the birefringence effect. A number of such embodiments may be realized by substituting TFT panels for the STN panels in the illustrated embodiments. (In such embodiments, the neutral polarizers typically provided on a TFT panel by the manufacturer may be removed, any spectral deficiencies of the panel may be compensated for by retardation film [i.e. commercially available panels are particularly deficient in the blue portion of the spectrum, which deficiency can be alleviated by retardation film], and colored polarizers may be added to achieve the benefits discussed earlier.)

Hybrid Display

Figure 41:
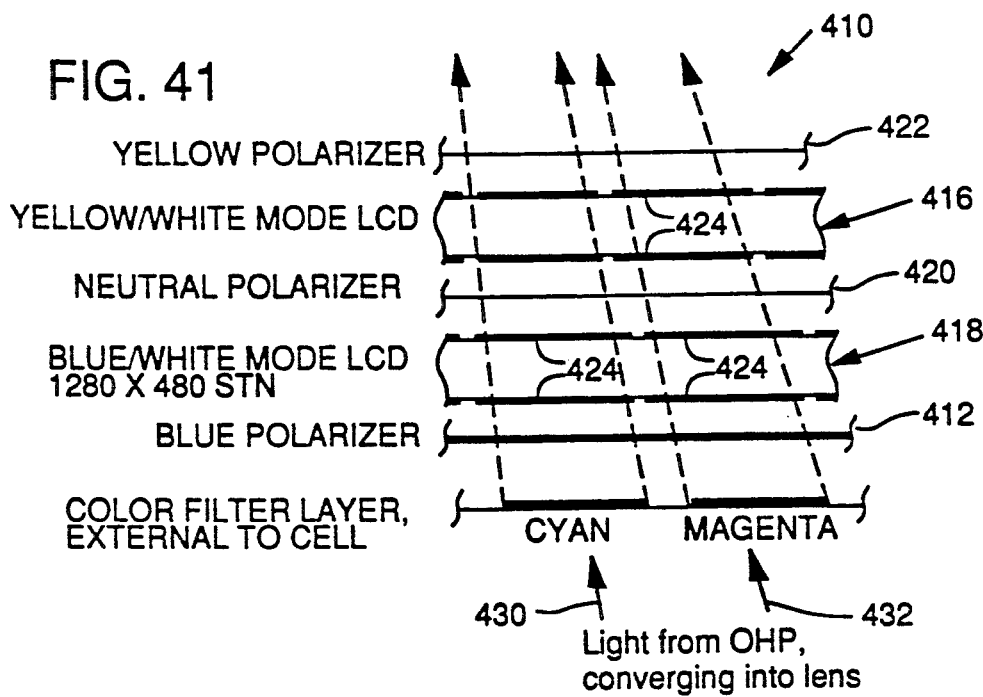
FIG. 41 is a schematic view of a hybrid color display subassembly according to one embodiment of the disclosed system.

According to another aspect of the disclosed system, a display device or subassembly 410 may be formed with a color mosaic filter 412, two color LCD panels 414, 416, and three polarizers 418, 420, 422, as shown in FIG. 41. (Panels 414, 416 used in the illustrated embodiment are again supertwisted nematic LCD panels that are controllably colored by exploitation of the birefringence effect.)

In the illustrated embodiment (as explained earlier), the first panel 414 is "tuned"0 as a blue filter (i.e. absorbing red and green) when deselected. The second panel 416 is tuned to operate as a yellow filter (i.e. absorbing blue).

It may be noted that, unlike most prior art stacked panel displays, the illustrated embodiment includes one panel of a primary color (i.e. blue) and one panel of a subtractive primary color (i.e. yellow). Their cooperative relationship to yield a full color display is made possible by the color mosaic filter 412, as described above.

In the illustrated embodiment, the yellow panel 416 includes a plurality of individually controllable pixels regularly arrayed in a 640 by 480 matrix. (In FIG. 41, each pixel is illustrated by the pair of electrodes 424 that defines it.) The blue panel 414 includes twice as many pixels, arrayed in a 1280 by 480 matrix. The blue panel is cooperatively positioned with the yellow panel so that each pixel of the yellow panel is optically superimposed on two pixels of the blue panel.

Figure 42:
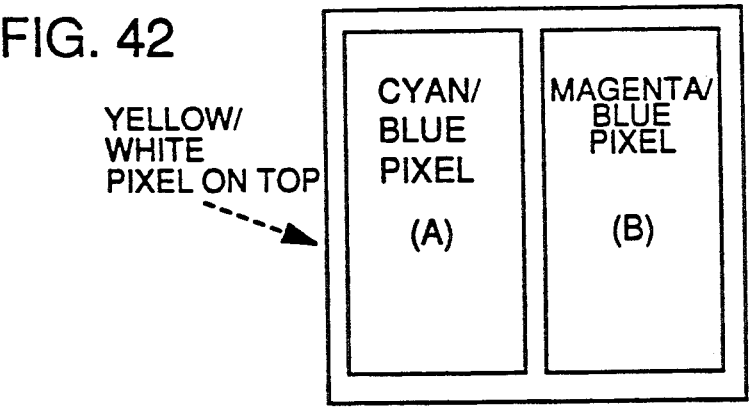
FIG. 42 is a schematic view illustrating correspondence between a single pixel in a yellow panel with two pixels in a blue panel and two pixels in a color mosaic filter in the hybrid display subassembly of FIG. 41.

The color mosaic filter 412 is comprised of a plurality of cyan and magenta filter elements, 426, 428 respectively, regularly arrayed in a 1280 by 480 matrix. The color mosaic filter is similarly cooperatively positioned with the blue and yellow panels 414, 416 so that each pixel of the filter is optically superimposed on one pixel of the blue panel, and each pair of pixels in the filter is optically superimposed on one pixel in the yellow panel. The above-described superimposition relationship is illustrated in FIG. 42.

The color mosaic filter 412 may be implemented in a number of ways. For example, the filter may comprise a dyed acetate or polyester substrate, aligned during fabrication with the other layers, or it may comprise the surface of one of the polarizer plates on which filter dyes are offset or screen printed.

The fabrication of color mosaic filters is more particularly detailed, inter alia, in U.S. Pat. Nos. 4,712,874, 4,770,525, 4,776,671, 4,773,737, 4,752,771, 4,690,511, 4,458,175 and 4,653,862.

In operation, all light passing through the display follows one of two different paths 430 or 432 (FIG. 41). The first path 430 is through a cyan filter element 426, the blue panel 414 and the yellow panel 416. The second path 432 is similar but starts with passage through a magenta filter element 428 and concludes by passing through the blue panel and the yellow panel.

Light following the first path 430 is first stripped of its red component (since the cyan mosaic filter element 426 attenuates red light). The remaining blue and green light next passes through the blue panel 414. If this panel is in its deselected state, it acts as a blue filter, passing only blue light. If this panel is in its selected state, it passes both the blue and green light.

The light exiting the blue panel 414 then enters the yellow panel 416. If the yellow panel is in its deselected state, it attenuates blue light, so passes no light if the blue panel was deselected, and passes only green light if the blue panel was selected. If the yellow panel is in its selected state, it passes all light, so passes blue light if the blue panel was deselected, and passes blue and green light (i.e. cyan light) if the blue panel was selected.

Light following the second path 432 is first stripped of its green component (since the magenta mosaic filter element 428 attenuates green light). The remaining red and blue light next passes through the blue panel 414. If this panel is in its deselected state, it acts as a blue filter, passing only blue light. If this panel is in its selected state, it passes both the blue and red light.

The light exiting the blue panel 414 then enters the yellow panel 416. If this yellow panel is in its deselected state, it attenuates blue light, so passes no light if the blue panel was deselected, and passes only red light if the blue panel was selected. If the yellow panel is in its selected state, it passes all light, so passes blue light if the blue panel was deselected, and passes blue and red light (magenta) if the blue panel was selected.

Figure 43:
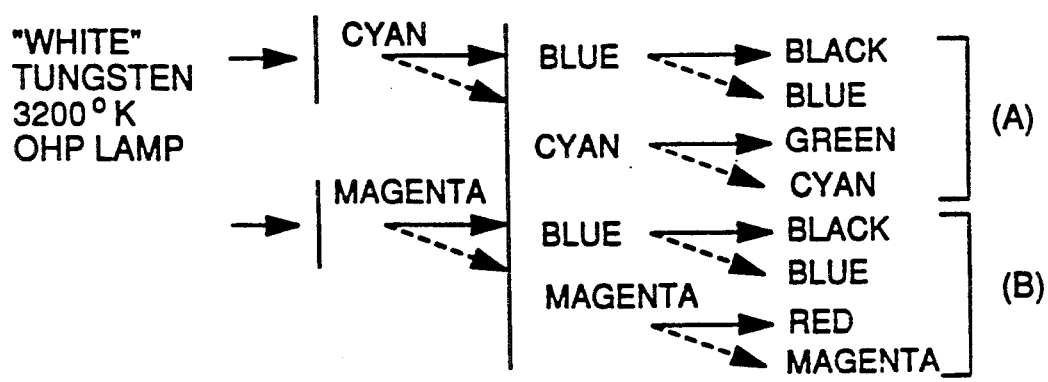
FIG. 43 illustrates the selective coloring of white light by the hybrid display subassembly of FIG. 41.

The colors resulting from these various combinations are illustrated in FIG. 43.

Each of the two paths 430, 432 can produce the colors black and blue. The double passage of blue is advantageous because most incandescent illumination has relatively less blue energy than energy of other colors. Thus, the passage of blue light through both paths acts to correct a color imbalance normally inherent with incandescent lighting. In particular, tungsten "white" or 3200° K is color corrected by this arrangement to 5600° K.

Neither of the paths 430 or 432 by themselves can produce yellow or white. However, the human eye can average adjoining cyan and magenta pixels to perceive white, and can average adjoining green and red pixels to perceive yellow. The average of the colors of two adjoining pixels is termed the color of a "super pixel," of which there are 640 across the width of the display. This arrangement thus can yield the full gamut of color.

Table V summarizes the foregoing discussion:

TABLE V

| After Filter Element | After Blue Panel | After Yellow Panel | Average |
|---|---|---|---|
| C | C (wh) | C (wh) | Wh |
| M | M (wh) | M (wh) | |
| C | C (wh) | G (yel) | Y |
| M | M (wh) | R (yel) | |
| C | C (wh) | C (wh) | C |
| M | B (b) | B (wh) | |
| C | C (wh) | G (yel) | G |
| M | B (b) | Blk (yel) | |
| C | B (b) | B (wh) | M |
| M | M (wh) | M (wh) | |
| C | B (b) | Blk (yel) | R |
| M | M (wh) | R (yel) | |
| C | B (b) | B (wh) | B |
| M | B (b) | B (wh) | |

TABLE V-continued

| After Filter Element | After Blue Panel | After Yellow Panel | Average |
|---|---|---|---|
| C | B (b) | Blk (yel) | Blk |
| M | B (b) | Blk (yel) | | where B is blue, Blk is black, C is cyan, G is green, M is magenta, R is red, W is white and Y is yellow, and the colors in parentheses indicate whether a panel pixel is in its white (selected) or colored (deselected) states.

The polarizers 418, 420, 422 used in the illustrated embodiment are needed to analyze the light passing through the liquid crystal panels 414, 416 in order to achieve perceptible contrast. As noted earlier, polarizers in prior art displays are usually neutral (i.e., dyed black by iodine). In the illustrated embodiment, colored polarizers can again be used in certain positions to pass more light, improving the brightness and allowing color balance improvements.

Panel 414 is illustrated as being blue when in its deselected state. Light entering it is polarized by an entrance polarizer 418. Normally, all colors of light orthogonal to the axis of polarizer 418 would be absorbed by the black dye of a conventional, neutral polarizer, resulting in an immediate loss of 50% of the light. This loss can be cut dramatically if the polarizer 418 is dyed blue. Such a polarizer still passes the white light parallel to the polarizer's axis, but additionally passes blue light orthogonal to its axis. This additional blue light is permitted to pass to the yellow panel 416 and ultimately contributes to the overall brightness of the resulting display, instead of being absorbed by the first polarizer as is normally the case. The losses normally associated with this first polarizer are thus cut by a third (radiometrically). Display brightness improves commensurately.

The same benefit can be achieved at the exiting end of the stacked assembly 410. Panel 416 is illustrated as being yellow in its deselected state. By dying the polarizer 422 adjacent thereto yellow, the red and green light that would normally be absorbed thereby is allowed to leak through, again improving display brightness.

In addition to the foregoing benefits, colored polarizers also ease the design requirements of the LCDs with which they are associated. While an LCD designer must normally be concerned about the performance of a panel across the entire spectrum, the use of a colored polarizer with the panel renders the performance at certain colors irrelevant. For example, in designing the blue panel 414, the designer need not worry about its performance in the selected and deselected states in the blue portion of the spectrum. The blue polarizer 418 will cause the panel to pass blue regardless of its state, so the designer can focus on optimizing performance in the green and red portions of the spectrum. Similarly with the yellow polarizer 422. Since this polarizer will cause the yellow panel 416 to pass green and red light regardless of its state, the designer can focus on optimizing performance of the panel in the blue portion of the spectrum.

Spectrophotometer plots showing the ideal and actual light transmission qualities of panels 414 and 416 (again, considered in conjunction with their associated polarizers) are provided in FIGS. 44 and 45, respectively. Panels suitable for use as panels 414, 416 are available from Kyocera of Kyoto, Japan or may be fabricated using known techniques.

Spectrophotometer plots showing the ideal and actual light transmission qualities of cyan and magenta filter elements 426, 428 are provided in FIGS. 46 and 47. Suitable filter materials or dyes are available from Crompton & Knowles, Brewer Science, Kodak Wratten, and Lee Colortran International.

Figure 48:
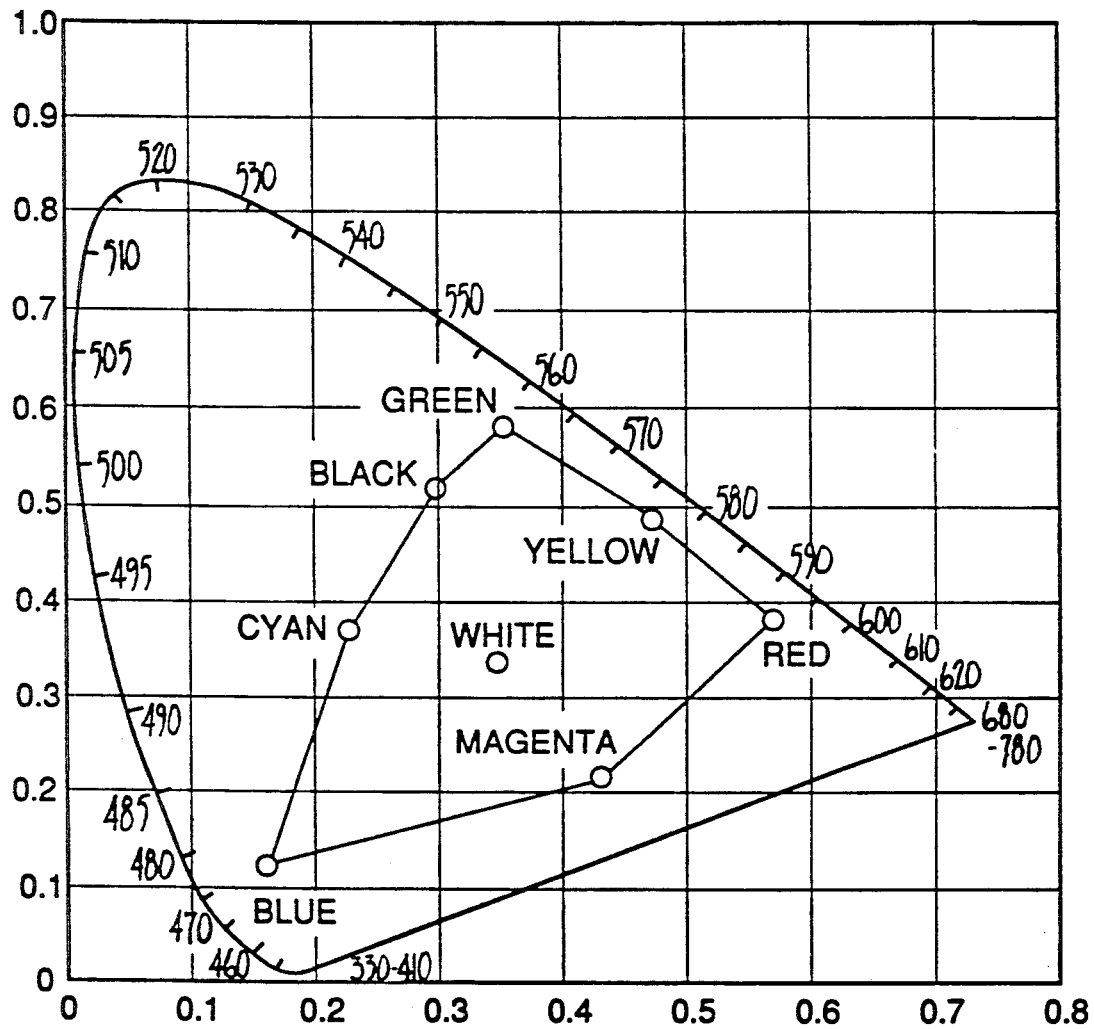
FIG. 48 is a chromaticity diagram illustrating the color gamut achieved with the display subassembly of FIG. 41.

As can be seen from the foregoing curves, neither the passage of light of the desired colors nor the attenuation of light of undesired colors is perfect in the actual panels and filters. However, the resulting effect is more than adequate to provide saturated colors throughout the human visual area. A chromaticity diagram illustrating the color gamut resulting from these imperfect elements (using color illumination) is shown in FIG. 48.

The foregoing discussion has described only one of many possible combinations of panel colors and mosaic filter colors. Others can readily be devised. Generally speaking, the preferred of these embodiments are characterized as follows:

the first panel has 2N pixels that pass either all colors, or only primary color C;

the second panel has N pixels that pass either all colors, or only a color subtractive primary (A+B);

the color mosaic filter has N pixels that pass the color subtractive primary (A+C), and N more pixels that pass the color subtractive primary (B+C); (where A, B and C are assigned from the primary colors red, green and blue).

Thus, other embodiments include one in which the filter elements are colored magenta and yellow, and the panels are colored red and cyan; and a second in which the filter elements are colored cyan and yellow, and the panels are colored green and magenta.

As noted earlier, the illustrated embodiment is advantageous due to the color correction it offers with incandescent light. However, these other embodiments have their own advantages. The embodiment with magenta and yellow filter elements, for example, can advantageously be used to color compensate fluorescent light, which is typically weak in the red portion of the spectrum.

It will be recognized that this hybrid foregoing display subassembly 410 may be used in any of the display systems described earlier.

From the foregoing description, it will be recognized that this hybrid embodiment solves many of the problems and deficiencies associated with prior art color display technologies. In addition to addressing the parallax and brightness problems noted earlier, the disclosed system offers a number of other advantages. One is the color compensation that corrects for the excessive red energy output from incandescent illumination sources. Another is a simplification that can be made in the display's drive circuitry due to the fact that the blue panel requires data at only twice the nominal shift clock frequency, instead of three-times as required with conventional three color filter displays. This 2× relation is easier to implement in digital logic than the 3× required in the prior art. Furthermore, the mosaic color filter can be fabricated independently of the polarizers and the panels, permitting its independent optimization. Its use of only two colors reduces the area on the filter dedicated to a black matrix that typically separates the constituent filter pixels, further increasing display brightness. Finally, the blue and yellow panels used in the illustrated embodiment are well developed designs that are based on well understood technology.

Having described and illustrated the principles of this hybrid display with reference to a preferred embodiment and several variations thereon, it should be apparent that the display can be modified in arrangement and detail without departing from such principles. For example, while the display subassembly has been described as including single supertwisted liquid crystal panels, other types, such as double supertwisted panels or panels embodying other technologies, can alternatively be used. Similarly, while the color mosaic filter has been described as comprising a plurality of pixels, in other embodiments a conventional color stripe arrangement may be used instead. Similarly, while the display subassembly has been described as including three polarizers, two LCD panels and one color mosaic filter, in other embodiments, additional optical components can also be used, as detailed earlier.

Still further, while the illustrated embodiment has shown a system in which entering light can pass through two distinct light paths within a single display subassembly, in alternative embodiments these two light paths can be defined by two separate assemblies. For example, a color projection system may comprise first and second projectors, with the first using a display subassembly having a solid magenta filter, a blue-controlling panel and a red-controlling panel; and the second using a display subassembly having a solid cyan filter, a blue-controlling panel and a green-controlling panel. In one embodiment, the red- and green-controlling panels can each be a blue/white mode LCD, as discussed above. The images from these two projectors can be superimposed and projected onto a common screen.

High Resolution Display

Figure 49:
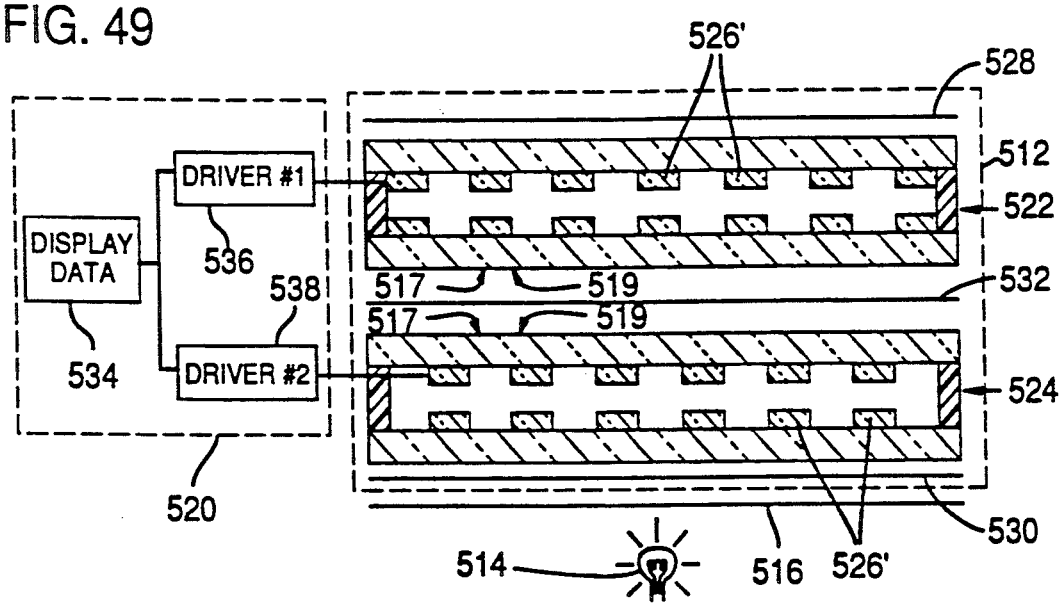
FIG. 49 is a partial schematic side view of a high resolution display system.

Referring to FIG. 49, a display system 510 includes a display subassembly 512, an illumination source 514, an entrance optic 516, an exit optic 518, and display driver circuitry 520.

The display subassembly 512 includes first and second panels 522, 524. Each has associated therewith a plurality of transparent electrodes 526 that can be controllably energized to change the state of the liquid crystal material sandwiched therebetween. In the illustrated panels, the electrodes are arranged in rows 517 that define active areas, interlaced with rows 519 without electrodes, which define inactive areas more clearly shown in FIG. 50. The two panels are stacked and aligned so that the active rows of one panel are in optical alignment with the inactive rows of the other panel. By this arrangement, the composite subassembly provides twice the number of rows of either panel by itself, yet avoids the fabrication difficulties associated with putting all these active rows on a single panel.

In the illustrated embodiment, each of the panels 522, 524 is fabricated with 512 active rows of 1280 horizontal pixels each. The composite display thus has a resolution of 1024×1280.

Figure 50:
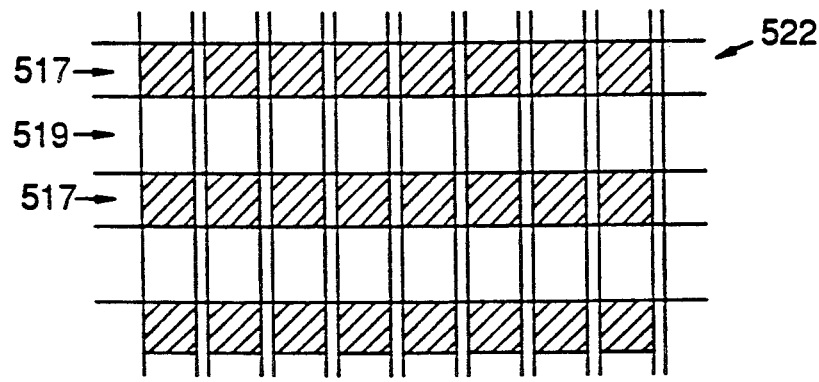
FIG. 50 is a partial top view of an LCD panel used in the display subassembly of FIG. 49.
Figure 51:
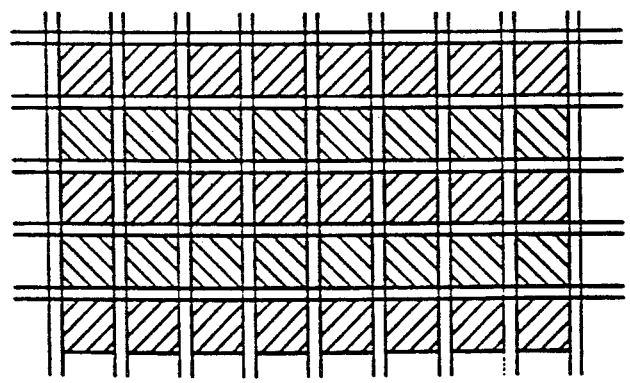
FIG. 51 is a partial top view of the subassembly of FIG. 49.

FIG. 50 is a partial top view of the first panel 522 showing the alternating active and inactive rows. FIG. 51 is a partial top view of the stacked subassembly 512 showing the interlacing of rows.

Sandwiching the two LCD panels 522, 524 are first and second polarizers 528, 530. In the FIG. 49 embodiment, a third polarizer 532 is interposed between the panels.

The display driver circuitry 520 includes a source 534 of display data, such as a computer or the like, and first and second driver circuits 536, 538. The first driver circuit 536 operates to receive display data from the source 534 and to provide data corresponding to the first, third, fifth video rows, etc, to driver circuitry that operates the active rows in the first panel 522. This driver circuitry is conventional and operates by partitioning the panel into top and bottom halves and refresh-scanning both halves simultaneously, as described in the Background of the Invention section. The first driver circuit 536 ignores the data relating the second, fourth, etc. rows. The second driver circuit 538 performs likewise with the second, fourth, sixth, etc. rows.

The display driver circuitry 520 used in the illustrated embodiment is also conventional, being another application of the well known display drivers that control two scans simultaneously.

The FIG. 49 embodiment can be practiced with virtually any LCD construction, such as twisted nematic, supertwisted nematic, double supertwisted nematic, phase change, etc. Double supertwisted nematic is particularly desirable in high resolution displays because it can provide a virtually true black and white image, as opposed to the color tinted images produced by the other technologies. In double supertwisted nematic panel construction, an additional, passive liquid crystal cell is used in conjunction with the primary liquid crystal cell to compensate for optical wavelength dependence in the primary cell. The passive cell is essentially identical to the primary cell except it has an opposite twist sense.

Figure 52:
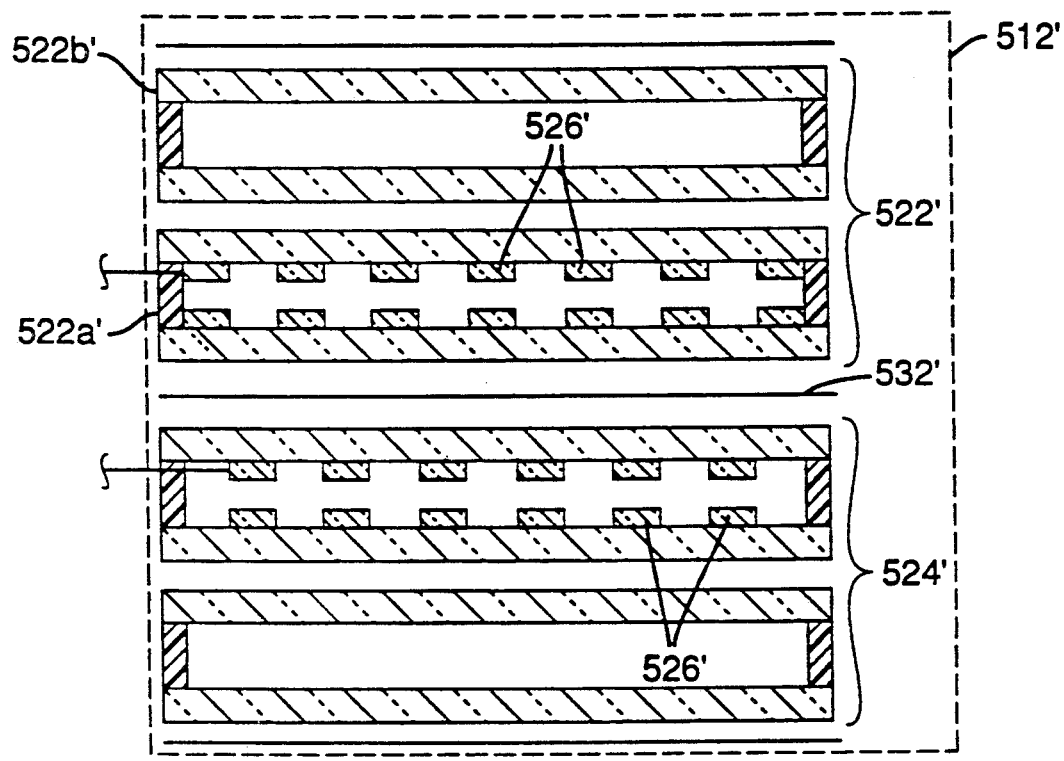
FIG. 52 is a partial side view of a display subassembly using double cells that may be employed in the display system of FIG. 49.

FIG. 52 shows a display subassembly 512' using double supertwisted panels. The first panel 522' includes an operative or active panel 522a' and a passive panel 522b'. The active panel 522a' includes electrodes 526' and is operated in conjunction with the passive panel 522b' that is fabricated without electrodes and with an opposite twist sense. The second panel 524' is constructed similarly.

Figure 53:
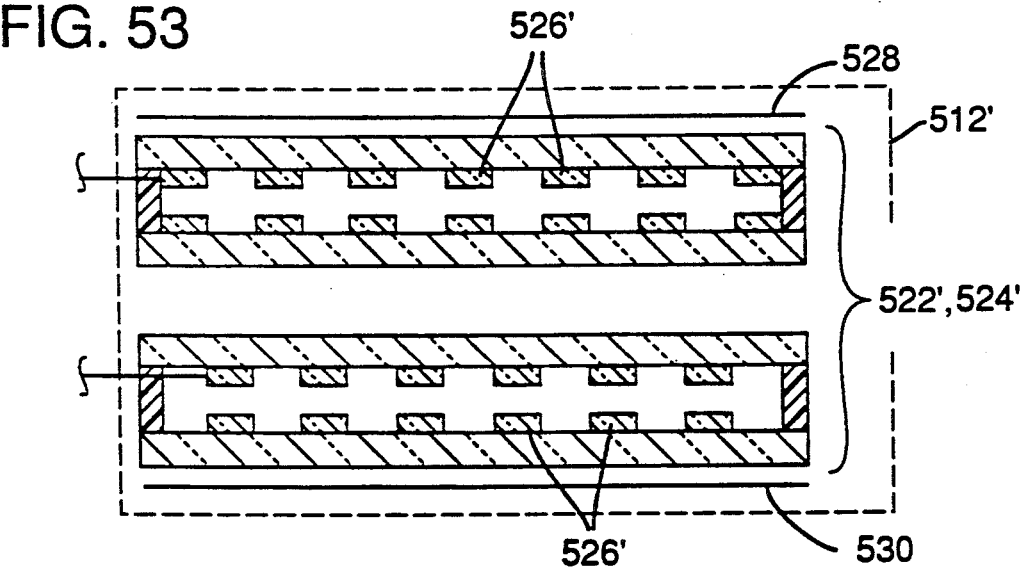
FIG. 53 is a partial side view of a display subassembly using a different implementation of double cells that may be employed in the display system of FIG. 49.

The construction of the double supertwisted display subassembly of FIG. 52 can be simplified considerably by fabricating the first and second active panels to have opposite twist senses. In such an embodiment, the inactive portions of one panel serve as the passive, reverse twist counterparts to the active portions of the other panel. Such an embodiment is shown in FIG. 53. In addition to eliminating two liquid crystal layers, this embodiment also permits the intermediate polarizer 532' to be omitted.

In order for these stacked panel display subassemblies to work without parallax limitations, the entrance optic 516 desirably collimates the illumination from the light source 514 in a direction orthogonal to the panels. This entrance optic 516 can take any of the forms discussed above in connection with the color displays. The collimated light exiting the display subassembly is also typically processed by an exit optic 518 which again can take any of the forms discussed above.

From the foregoing description, it will be recognized that the described high resolution display system overcomes the electrical and interconnection constraints that have previously limited liquid crystal displays to relatively low resolution applications.

Figure 54:
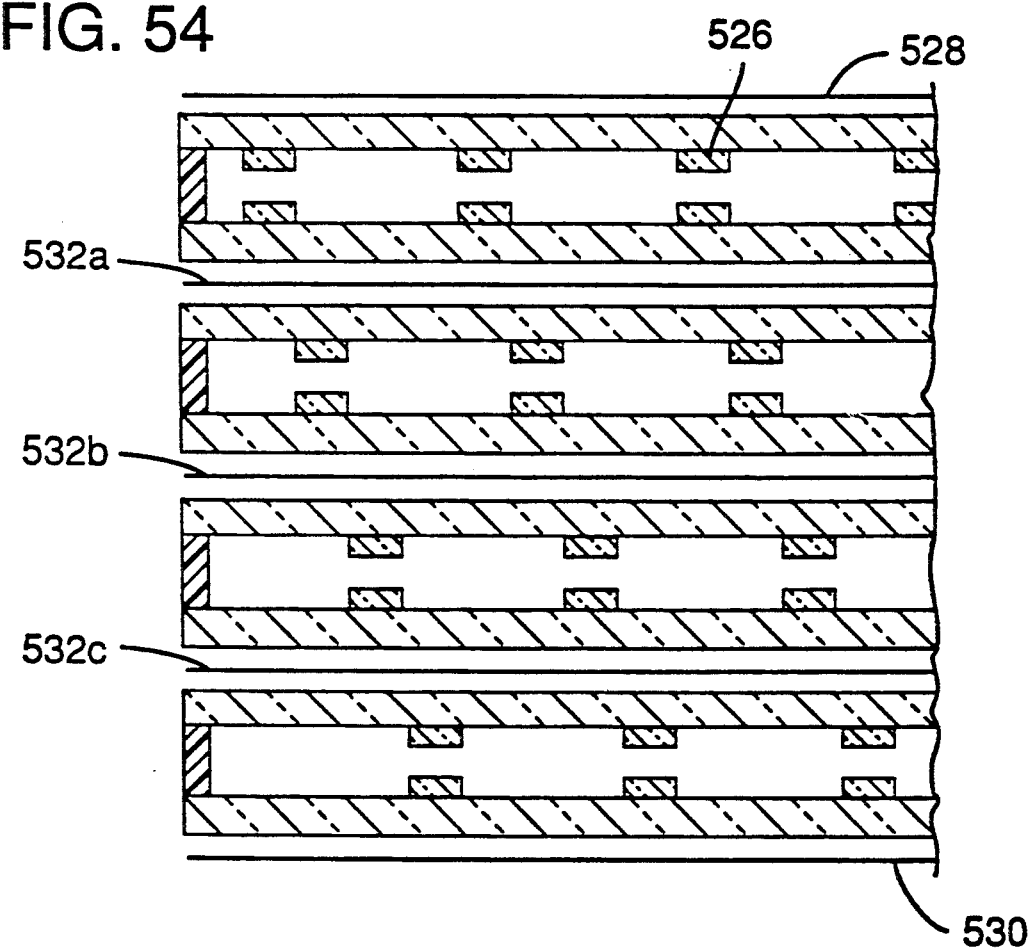
FIG. 54 is a partial side view of a display subassembly in which the active rows are distributed over four panels.

It will be recognized that other high resolution displays can readily be devised using these principles. For example, while the display subassembly has been described as having its active rows distributed between two stacked panels, it will be recognized that in alternative embodiments the active rows may be distributed among three or more panels to attain still higher resolution. Such an arrangement, employing active rows on four panels, is shown in FIG. 54. Similarly, while the display subassembly has been described as having active rows on one panel interlaced with active rows on another panel, it will be recognized that the rows need not be interlaced. Instead, for example, one panel may have a plurality of contiguous rows that form the top portion of the display, and the second panel may have a plurality of contiguous rows that form the bottom portion of the display. Finally, while the display subassembly has been described as providing a monochromatic display, it will be recognized that several such displays can be stacked and operated cooperatively to provide a full color display. In one such embodiment, one display (comprised of two or more stacked panels) can be tuned to switch between the colors cyan and white, a second display can be tuned to switch between magenta and white, and a third display can tuned to switch between yellow and white, as described earlier. These three displays, stacked with polarizers (which may be colored for increased transmissivity) can yield a high resolution full color display.

In other high resolution color embodiments, color stripe or color mosaic filters may be employed with the disclosed stacked, interlaced panels in a spatial or temporal additive color system. Still other color embodiments may use conventional birefringent or dye color generation methodologies.

Improving Contrast Ratio

The contrast ratio of display assembly 510 of FIG. 49 may be improved by modifying the birefringent properties of passive regions in a mutual compensation scheme. It is to be understood that the contrast ratio is the ratio of transmitted luminance of a bright state to a dark state. When it is desired to obtain a dark state, the transmitted luminance of the dark state is determined by the light leakage.

Display assembly 510 of FIG. 49 and sub-assembly 512' of FIG. 53 obtain high resolution STN black and white displays by interleaving or optically aligning active regions on one panel with passive regions of the other panel. Each pixel thus comprises an active region on one panel and a passive region on the second panel. When the passive region has an equal twist angle but opposite twist sense, (and the active region is in the non-select state), light passing through the active region is "twisted" by a pre-determined amount and "untwisted" by an equal and opposite amount by the passive region. The net effect is that polarized light exits the display subsystem with its original orientation. By passing the light exiting the pixel through a polarizer substantially all of the light may be blocked and the pixel appears black.

It will be recognized that under ideal conditions, the passive region, having an equal and opposite twist with respect to the active region, compensates for the natural birefringence of the liquid crystals in the non-selected active region.

When the active region of a pixel is selected, light passing through the active region is given a different "twist" that is no longer perfectly compensated by the passive region. Thus, substantially all light may be transmitted through the polarizer and the pixel appears white or bright.

Figure 55:
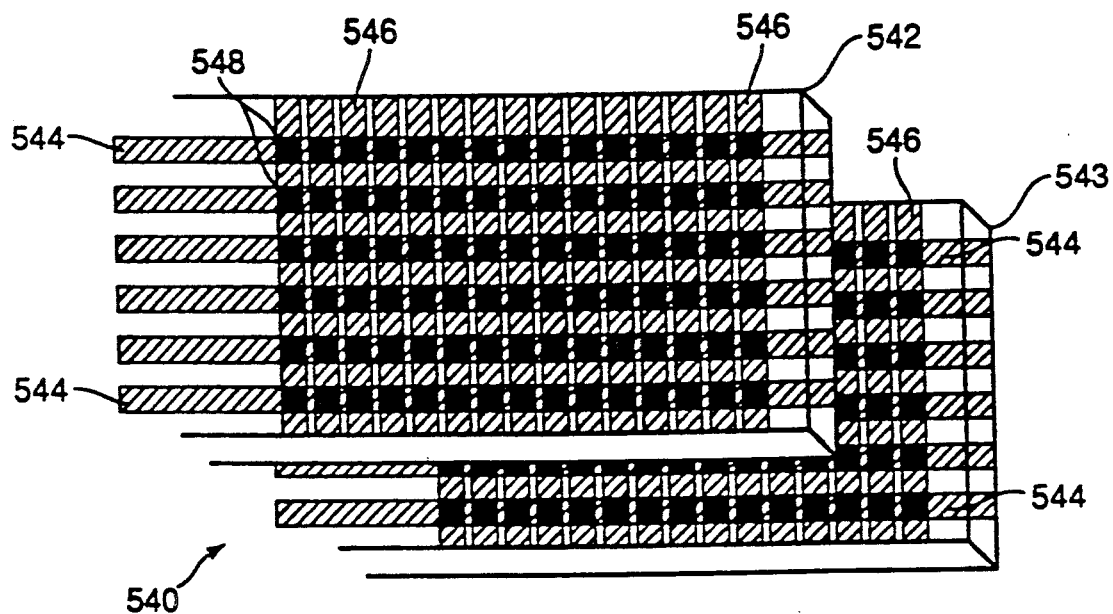
FIG. 55 is a partial perspective view of a two-cell birefringent display sub-system.

In FIG. 55, display subsystem 540 is fabricated in such a manner that first and second panels 542 and 543 have opposite twist senses. By way of example, the liquid crystal in panel 542 may be given a right handed twist and liquid crystal in panel 543 may be given a left handed twist. The liquid crystal material in both panels 542 and 543 may be given a common twist angle between 90° and 360°. Panels 542 and 543 have a matrix formed of row and column electrodes 544 and 546, respectively. Electrodes 544 and 546 comprise transparent coatings of Indium-Tin Oxide (ITO) applied to panels 542 and 543 in a manner known in the art.

Figure 56:
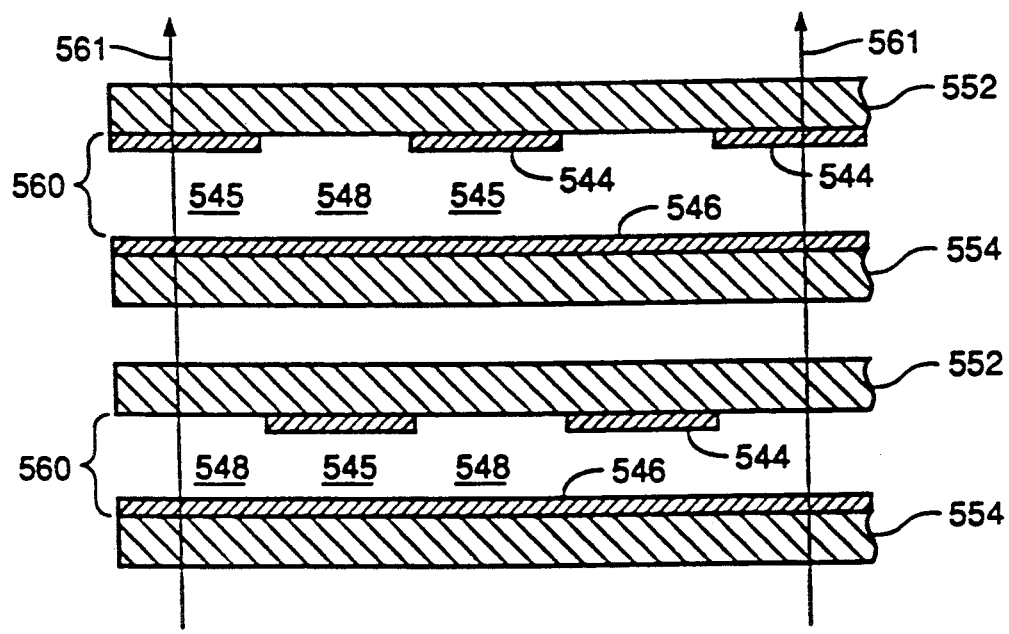
FIG. 56 is a partial side view of the two panels of the display sub-system of FIG. 55.

In display sub-system 540, it should be understood that panels 542 and 543 each comprise a pair of glass plates 552 and 554, such as shown in FIG. 56 (which is a side view of subsystem 540 rotated 90°. Row electrodes 544 are affixed on the inner surface of plate 552 and column electrodes 546 are similarly affixed on plate 554. Plates 552 and 554 are spaced apart by a gap 560 and liquid crystal material (not shown) is disposed within the region defined by gap 560. Active regions 545 are formed where row electrodes 544 overlay column electrodes 546. Incident light, designated by arrows 561, passes through both an active region 545 and a passive region 548. It should be understood that light 561 is incident across the entire surface of plate 554.

For high resolution display systems the contrast ratio may be improved by modifying the $\Delta nd$ of passive regions 548 according to a mutual compensation scheme.

Figure 57:
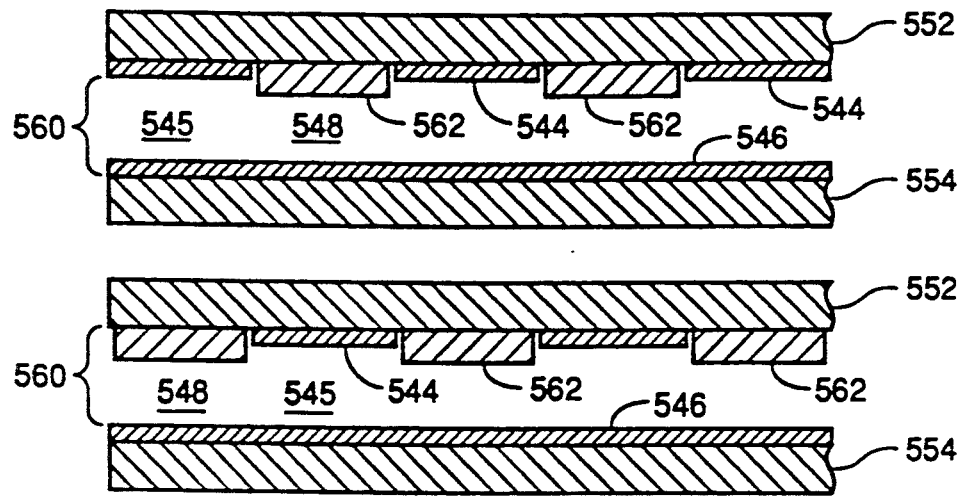
FIG. 57 shows the panels of FIG. 56 with a first embodiment of a mutual compensation scheme.

Referring now to FIG. 57, one alternative embodiment of the mutual compensation scheme is shown where the $\Delta nd$ product in passive regions 548 is modified by the addition of a clear non-birefringent material 562. In one preferred embodiment, a layer of silicon dioxide (SiO2) is deposited or screened onto glass plates 552 between row electrodes 544. Non-birefringent material 562 is preferably placed as an elongated stripe parallel to, and between, row electrodes 544.

It is desirable that non-birefringent material 562 have a thickness that is related to the dimensions of gap 560. In double layer STN displays, the $\Delta nd$ product of passive regions 548 is preferably approximately 2–10% smaller than the $\Delta nd$ product of active region 545. Accordingly, for one preferred embodiment where gap 560 is approximately six micrometers (6 $\mu m$), non-birefringent material 562 would preferably have a thickness in the range of 1,200–6,000 Å. The application of non-birefringent material 562 effectively decreases the dimension of gap 560 in passive regions 548. In this manner, the $\Delta nd$ product in passive regions 548 no longer matches the $\Delta nd$ product in active regions 545 when no voltage is applied to the panel.

Figure 58:
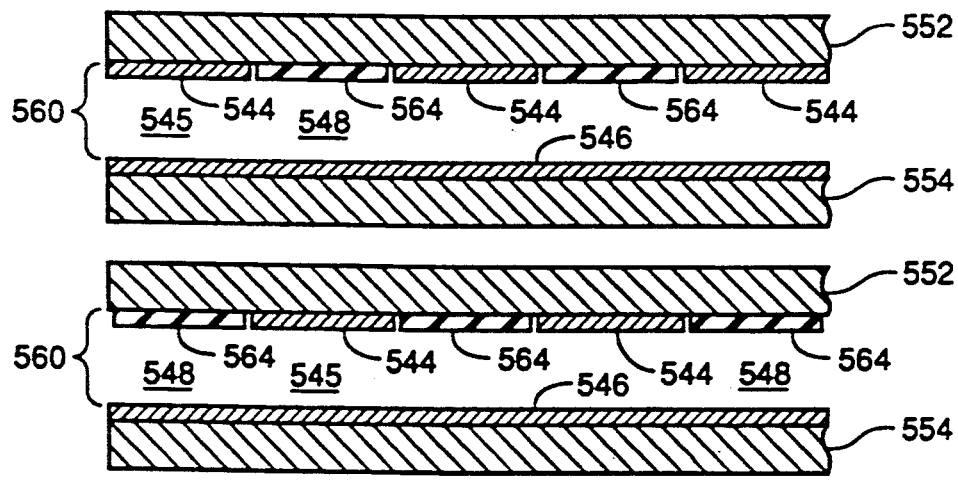
FIG. 58 shows the panels of FIG. 56 with a second embodiment of the mutural compensation scheme.

Referring now to FIG. 58, a second embodiment for improving the contrast ratio is disclosed. In this embodiment, compensating row electrodes 564 are added to passive regions 548 between active row electrodes 544. Compensating row electrodes 564 bias the liquid crystal material in passive regions 548 at a constant, non-selected voltage. The contrast ratio is improved because of the perfect compensation obtained between active regions 545 in the non-select state and passive regions 548.

Figure 59:
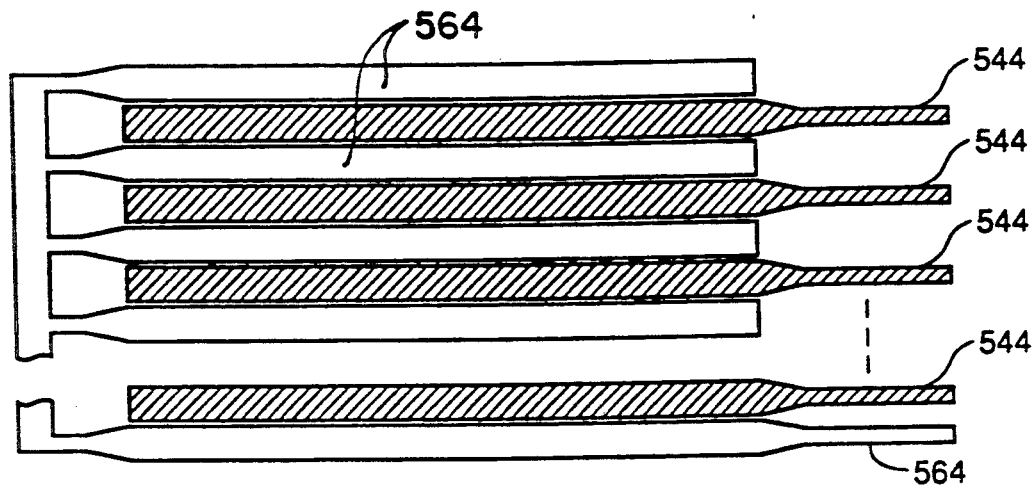
FIG. 59 shows one preferred manner of interconnecting compensating row electrodes of the second embodiment of the mutual compensation scheme.

The refresh requirements of compensating row electrodes 564 are identical to the refresh requirements of active row electrodes 544. Introduction of compensating row electrodes 564 onto each cell 542 and 543 would require a doubling of the system's multiplex rate. Clearly, doubling the multiplexing rate to enhance the contrast ratio is not viable. Accordingly, as shown in FIG. 59, compensating row electrodes 564 are preferably connected in parallel and simultaneously refreshed. Thus, in a display system having a 240:1 multiplex rate, compensating row electrodes 564 require only that the multiplex rate be increased to 241:1.

Figure 60:
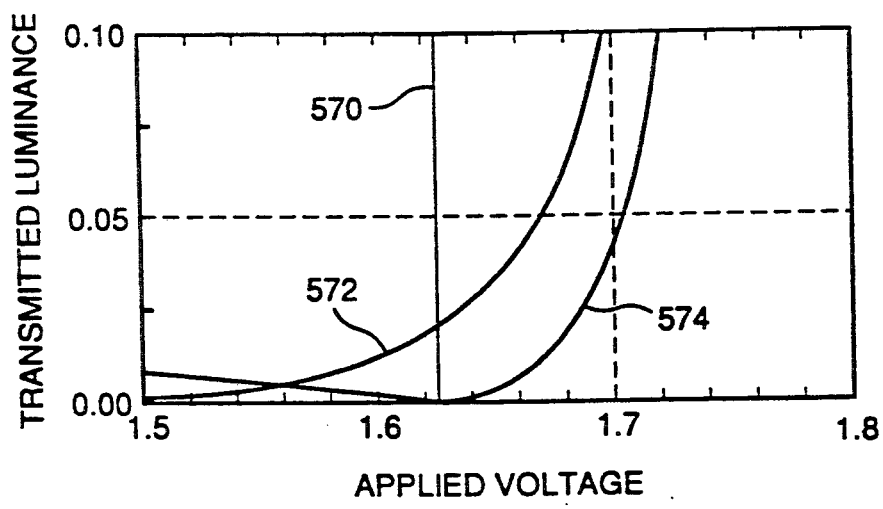
FIG. 60 is a graph showing the computed difference in transmitted luminance that may be obtained by use of the mutual compensation scheme.

The improvement obtained from modifying the $\Delta nd$ product in passive regions 548 may be more clearly understood with reference to FIG. 60. In FIG. 60, the transmitted luminance is plotted with respect to the applied voltage at a particular active region 545. A curve 572 indicates the transmitted luminance for display sub-system 540 (FIG. 55) in which no compensation scheme is employed or when no voltage is applied to compensating row electrodes 564. A curve 574 indicates the transmitted luminance obtainable for display sub-system 540 in which the compensation scheme is employed.

For a high contrast ratio, it is desireable to reduce the transmitted luminance of the non-select state to as close to zero as possible. With no compensation scheme, curve 572 asymptotically approaches zero as the applied voltage approaches zero.

To obtain the white or bright state, it is desired to increase the transmitted luminance to the highest extent possible. As indicated by the upper portion of curve 572, drive voltages of greater than 1.7 volts are preferred for a bright output. In high resolution displays having the transmitted luminance plot as depicted by curve 572, a voltage along the knee portion is chosen for the non-select voltage such as is indicated by line 570. One skilled in the art will realize that the exact voltage applied between electrodes 544 and 546 in the non-select and the select states will vary according to the specific sub-system requirements.

When display sub-system 540 is provided with a compensation scheme, such as the embodiment disclosed in FIGS. 57 or 58, the transmitted non-select luminance is significantly lower than the transmitted luminance of a sub-system without compensation. Specifically, as indicated by curve 574, the transmitted luminance is zero or substantially zero at the non-select voltage then increases rapidly for increasing voltage levels.

For a non-select state, i.e. no transmitted luminance, a voltage level of approximately 1.6 may be chosen. A higher voltage, such as 1.72 volts, provides a very bright light. Thus, for a very small change in the applied voltage, a pixel may be changed from a very dark pixel to a very bright pixel.

In order to obtain high multiplexing rates, such as 240:1, the voltage drive levels applied to electrodes 544 and 546 for a select state and a non-select state must necessarily be close to each other. For example, in a system having a 240:1 multiplex rate, the high and low drive levels may differ by only approximately 6%. By incorporating the mutual compensation schemes of FIGS. 57 and 58, it is possible to obtain both high multiplex rates and high contrast.

Conclusion

In view of the wide variety of embodiments to which the principles of our invention may be applied, it should be recognized that the illustrated embodiments are to be considered illustrative only and not as limiting the scope of the invention. Instead, we claim as our invention all such modifications as may come within the scope and spirit of the following claims and equivalents thereto.

What is claimed is:

1. A method of providing a high resolution display comprising the steps:

providing a first liquid crystal cell of the supertwisted nematic type;

operating the first liquid crystal cell to define a first display row;

compensating wavelength-dependent optical effects exhibited by the first display row by providing a second liquid crystal cell of the supertwisted nematic type in an optical assembly with said first cell, said second cell having opposite twist sense from the first cell and presenting a passive area in superimposed relationship with the first display row, said passive area in the second cell providing an opposite twist counterpart to the first display row, thereby compensating for the first display row's wavelength-dependent effects;

operating said second liquid crystal cell to define a second display row;

compensating wavelength-dependent optical effects exhibited by the second display row by providing in the first liquid crystal cell a passive area in superimposed relationship with the second display row, said passive area providing an opposite twist counterpart to the second display row, thereby compensating for its wavelength-dependent effects;

providing a third liquid crystal cell of the supertwisted nematic type in the optical assembly with the first and second liquid crystal cells;

operating the third liquid crystal cell to define a third display row;

compensating wavelength-dependent optical effects exhibited by the third display row by providing a fourth liquid crystal cell of the supertwisted nematic type in the optical assembly, said fourth cell having opposite twist sense from the third cell and presenting a passive area in superimposed relationship with the third display row, said passive area in the fourth cell providing an opposite twist counterpart to the third display row, thereby compensating for the third display row's wavelength dependent effects;

operating said fourth liquid crystal cell to define a fourth display row;

compensating wavelength-dependent optical effects exhibited by the fourth display row by providing in the third liquid crystal cell a passive area in superimposed relationship with the fourth display row, said passive area providing an opposite twist counterpart to the fourth display row, thereby compensating for its wavelength-dependent effects.

2. A color display comprising:

first and second optics;

first, second and third display subassemblies disposed between said optics;

each of said display subassemblies including a liquid crystal panel defining a plurality of independently operable pixels;

at least two of said display subassemblies having different values of $\Delta nd$;

first, second, third and fourth polarizers;

the first display subassembly being disposed between the first and second polarizers;

the second display subassembly being disposed between the second and third polarizers;

the third display subassembly being disposed between the third and fourth polarizers;

wherein at least two of the three liquid crystal panels comprise liquid crystal material having an inherent molecular twist angles in excess of 150 degrees, and wherein the first and fourth polarizers are colored a color other than black.

3. A high resolution display system having an improved contrast ratio comprising:

at least a first and a second liquid crystal display panel; each of said panels comprising a first and a second glass substrate having a gap therebetween; said gap having liquid crystal material disposed therein; said liquid crystal material having a first twist angle in said first panel and a second twist angle in said second panel;

said first substrate having a plurality of spaced row electrodes and said second substrate having a plurality of spaced column electrodes so as to form a matrix; said matrix substantially defining a plurality of active regions and a plurality of non-active regions whereby the transmitted luminance of said liquid crystal may be selectively controlled in said active regions;

a clear non-birefringent material applied to one of said substrates only between said electrodes for decreasing the gap spacing between said first and second substrates in said non-active regions.

4. The display system of claim 3 wherein the thickness of said clear non-birefringent material is between 1 and 20 percent of said gap dimension.

5. The display system of claim 3 wherein said clear non-birefringent material comprises silicon dioxide.

6. The display system of claim 5 wherein said clear non-birefringent material is in the form of a plurality of elongated stripes substantially parallel and proximate to said row electrodes.

7. The display system of claim 3 wherein said first and second liquid crystal display panels comprise STN display panels capable of displaying a plurality of colors.

8. A display system having an liquid crystal display with a high contrast ratio; said display system comprising:

at least a first and a second liquid crystal display panel; each of said panels comprising a first and a second substrate having a gap therebetween; said gap having liquid crystal material disposed therein; said first substrate having a plurality of spaced row electrodes and said second substrate having a plurality of spaced column electrodes so as to form a matrix; said matrix substantially defining a plurality of active regions and a plurality of non-active regions of liquid crystal material whereby the transmitted luminance of said liquid crystal may be selectively controlled in said active regions;

said first substrate further having a plurality of compensator row electrodes placed between said row electrodes; said compensator row electrodes electrically connected in parallel and biased at a non-select voltage so as to provide a color display system with a high contrast ratio.

9. The display system of claim 8 wherein said compensator row electrodes are biased to a non-select voltage level whereby it is possible to multiplex the refresh of said compensator row electrodes with the refresh of each of said row electrodes.

10. The display system of claim 8 wherein transmitted luminance of the non-select active regions is substantially zero when the compensator row electrodes are biased at the non-select voltage.

11. A high resolution display system having an improved contrast ratio comprising:
   a first and a second liquid crystal display panel, each having liquid crystal material confined between a pair of spaced substrates; each of said panels having a plurality of active regions and a plurality of non-active regions defined by active row and column electrodes for selectively controlling the birefringent properties of said liquid crystal material in said active regions; said liquid crystal material confined in said first panel having an equal twist angle and an opposite twist sense relative to the liquid crystal material confined in said second panel;
   means for decreasing the Δnd product of the liquid crystal material only in said non-active regions.

12. The display system of claim 11 wherein said means for decreasing the Δnd product includes a layer of silicon dioxide between said active row electrodes on each of said display panels; said silicon dioxide layer having a thickness between about 2 to 10 percent of the space between said substrates.

13. The display system of claim 11 wherein said means for decreasing the Δnd product a plurality of compensating row electrodes between said active row electrodes on each of said display panels.

14. The display system of claim 13 wherein said compensating row electrodes on each of said panel are electrically connected in parallel and simultaneously refreshed at periodic intervals.

15. A color display apparatus comprising:
   first and second optically aligned assemblies, each including a liquid crystal panel exhibiting a birefringent effect that varies in response to an excitation signal applied to it;
   wherein said first and second assemblies are tuned so that a birefringent effect exhibited by said first assembly when a first signal is applied thereto differs from a birefringent effect exhibited by said second assembly when the same first signal is applied thereto;
   a third assembly including a liquid crystal panel optically aligned with said first and second assemblies and operable to increase the contrast ratio of said apparatus responsive to an excitation signal applied to it;
   first and second polarizers sandwiched about said assemblies; and
   third and fourth polarizers interposed between said assemblies.

16. The display system of claim 15 wherein said first and second display panels comprise birefringent supertwisted nematic liquid crystal panels having twist angles greater than or equal to 180 degrees and less than 360 degrees.

17. The display system of claim 16 wherein said third assembly is disposed between two neutral polarizers.

18. The display system of claim 16 wherein said third display assembly is disposed between said first and second display assemblies.

19. The display system of claim 18 wherein the color of said first and second polarizers are selected from the list: red, green and blue; the color of said second polarizer differs from the color of said first polarizer.

* * * * *